United States Patent
Emanuel et al.

(10) Patent No.: US 8,196,835 B2
(45) Date of Patent: *Jun. 12, 2012

(54) METHOD AND APPARATUS FOR DETERMINING POSITION AND ROTATIONAL ORIENTATION OF AN OBJECT

(75) Inventors: David C. Emanuel, Newark, DE (US); Larry G. Mahan, Newark, DE (US); Richard H. Ungerbuehler, Middletown, DE (US)

(73) Assignee: Sky-Trax, Inc., New Castle, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/960,728

(22) Filed: Dec. 6, 2010

(65) Prior Publication Data

US 2011/0121068 A1    May 26, 2011

Related U.S. Application Data

(63) Continuation of application No. 11/292,463, filed on Dec. 3, 2005, now Pat. No. 7,845,560.

(60) Provisional application No. 60/635,813, filed on Dec. 14, 2004.

(51) Int. Cl.
G06K 7/10    (2006.01)

(52) U.S. Cl. .................. 235/462.08; 235/472.01

(58) Field of Classification Search ............ 235/462.01–462.45, 472.01, 472.02, 472.03
See application file for complete search history.

(56) References Cited

U.S. PATENT DOCUMENTS

| | | | |
|---|---|---|---|
| 4,684,247 A | 8/1987 | Hammill | |
| 5,051,906 A | 9/1991 | Evans, Jr. et al. | |
| 5,367,458 A | 11/1994 | Roberts et al. | |
| 5,525,883 A | 6/1996 | Avitzour | |
| 5,604,715 A | 2/1997 | Aman et al. | |
| 5,617,335 A | 4/1997 | Hashima et al. | |
| 5,793,934 A | 8/1998 | Bauer | |
| 5,828,770 A | 10/1998 | Leis et al. | |
| 5,832,139 A | 11/1998 | Batterman et al. | |
| 5,893,043 A | 4/1999 | Moehlenbrink et al. | |
| 6,137,893 A | 10/2000 | Michael et al. | |

(Continued)

FOREIGN PATENT DOCUMENTS

EP    0367526    5/1990

(Continued)

OTHER PUBLICATIONS

S. Aoyagi et al., "A Position and Orientation Measurement of a Mobile Robot by Image Recognition of Simple Barcode Landmarks and Compensation of Inclinations," Trans. The Institute of Electrical Engineers of Japan, 121-C, 2, 2001.

(Continued)

*Primary Examiner* — Thien M Le
(74) *Attorney, Agent, or Firm* — Pepper Hamilton LLP

(57) ABSTRACT

A method and apparatus for determining position and rotational orientation of an object within a predetermined area is disclosed. Position markers, encoded with their identity, are viewed with a camera, images are captured and processed, and the position and rotational orientation of the object are calculated. Three embodiments are disclosed; the first having a camera mounted on the movable object while position markers bearing linear bar codes are fixed in location, the second having a camera mounted on the movable object while position markers bearing two-dimensional bar codes are fixed in location, and the third having a position marker of either type affixed to the object while the camera is fixed in location.

10 Claims, 22 Drawing Sheets

U.S. PATENT DOCUMENTS

| | | |
|---|---|---|
| 6,453,223 B1 | 9/2002 | Kelly et al. |
| 6,542,824 B1 | 4/2003 | Berstis |
| 6,556,722 B1 | 4/2003 | Russell et al. |
| 6,661,449 B1 | 12/2003 | Sogawa |
| 6,697,761 B2 | 2/2004 | Akatsuka et al. |
| 6,728,582 B1 | 4/2004 | Wallack |
| 6,732,045 B1 | 5/2004 | Irmer |
| 6,859,729 B2 | 2/2005 | Breakfield et al. |
| 7,370,803 B2 | 5/2008 | Mueller et al. |
| 7,372,451 B2 | 5/2008 | Dempski |
| 7,667,646 B2 | 2/2010 | Kalliola et al. |
| 7,681,796 B2 * | 3/2010 | Cato et al. ............ 235/462.08 |
| 7,721,967 B2 | 5/2010 | Mueller et al. |
| 7,845,560 B2 * | 12/2010 | Emanuel et al. ........ 235/462.08 |
| 2004/0016077 A1 * | 1/2004 | Song et al. ............ 15/319 |
| 2004/0183751 A1 * | 9/2004 | Dempski ............ 345/8 |
| 2010/0091096 A1 * | 4/2010 | Oikawa et al. ............ 348/53 |

FOREIGN PATENT DOCUMENTS

EP      1437636      7/2004

OTHER PUBLICATIONS

R. Baczyk et al., "Vision-Based Mobile Robot Localization With Simple Artificial Landmarks," Prep. 7th IFAC Symp. Robot Control, Wroclaw, Poland, 2003, pp. 217-222.

C. B. Owen et al., "What is the best fiducial?," in Augmented Reality Toolkit, the First IEEE International Workshop, 2002.

M. Fiala, "Vision guided control of multiple robots," in Proceedings of the First Canadian Conference on Computer and Robot Vision, (Washington DC, USA), IEEE Computer Society, May 2004, pp. 241-246.

Third Party Observations dated Oct. 13, 2011 filed in related European Patent Application No. 05848492.4.

\* cited by examiner

Barcode Encoding grid location "AA01"

| Marker ID | Actual X (feet) | Actual Y (feet) | Actual Z (feet) | Actual θ (degrees) | Actual Size (inches) |
|---|---|---|---|---|---|
| AA01 | 1.0 | 1.0 | 22.0 | 0.0 | 8.0 |
| AA02 | 1.0 | 4.0 | 22.1 | +0.8 | 8.0 |
| AA03 | 1.1 | 7.0 | 21.9 | +1.2 | 8.0 |
| AB01 | 4.0 | 1.0 | 22.0 | -1.0 | 8.0 |
| AB02 | 4.1 | 4.0 | 22.0 | -0.4 | 8.4 |
| AB03 | 4.2 | 7.1 | 22.1 | 0.0 | 8.1 |
| AC01 | 7.1 | 1.1 | 22.2 | 0.0 | 8.0 |
| AC02 | 7.2 | 4.1 | 22.1 | -0.5 | 8.0 |
| AC03 | 7.0 | 7.2 | 21.9 | +2.2 | 7.8 |

FIG. 7

| Marker ID | Actual X (feet) | Actual Y (feet) | Actual Z (feet) | Actual θ (degrees) | Actual Size (inches) |
|---|---|---|---|---|---|
| AD01 | 20.0 | 1.0 | 22.0 | 0.0 | 8.0 |
| AD02 | 20.1 | 4.0 | 22.1 | +0.6 | 8.0 |
| AD03 | 19.9 | 7.0 | 21.9 | +1.2 | 8.3 |
| AE01 | 23.2 | 1.0 | 22.0 | -1.0 | 8.3 |
| AE02 | 23.0 | 4.0 | 22.0 | -0.2 | 8.3 |
| AE03 | 23.1 | 7.1 | 22.1 | 0.0 | 8.0 |

FIG. 16

METHOD AND APPARATUS FOR DETERMINING POSITION AND ROTATIONAL ORIENTATION OF AN OBJECT

PRIORITY CLAIM

This application is a continuation application of U.S. patent application Ser. No. 11/292,463, filed Dec. 3, 2005, which claims the benefit of U.S. Provisional Application Ser. No. 60/635,813, filed Dec. 14, 2004.

SCOPE OF THE INVENTION

The invention presents a method, apparatus, and system for determining position and rotational orientation of an object in a predefined two-dimensional space.

FIELD OF THE INVENTION

A method, apparatus, and system to determine the position and rotational orientation of an object in a predefined space, in which a machine vision image acquisition apparatus acquires an image and processes the acquired image, and a computer calculates the object's position and rotational orientation based on processed image data. Position is determined in one or two dimensions. Rotational orientation (heading) is determined in the degree of freedom parallel to the plane of motion.

The method and apparatus of the present invention present a general solution to the problem of object location and may be applied to many fields of use. Two application examples follow.

Vehicle Tracking

It would be useful to know the location and movement of vehicles such as industrial lift trucks indoors. Radio-based navigation systems such as GPS can be used quite effectively aboard vehicles outdoors, but there exists today no ubiquitous position determination means for indoor use comparable to GPS. A number of methods are used to guide robots and automatic guided vehicles (AGV) indoors, but these vehicles are often designed to move along predetermined paths. AGV guidance systems commonly use embedded wiring, fixtures, or other fixed means to guide vehicles along prescribed paths. Optical systems have been developed that utilize rotating laser beams to reflectively detect position markers placed horizontally, but the beam's field of view can easily become blocked in a factory or warehouse. Camera based systems which view objects near a vehicle and interpret position and/or motion from image data are disclosed, but these deal with very challenging image analysis problems and are not suitable for exact position or heading determination.

The current invention allows vehicles full freedom of movement and freedom of rotation while maintaining the ability to determine position and rotational orientation at any location and at any rotational orientation within the designated area or volume.

Stored Goods Location Determination

Objects are frequently stored on indoor floors or in outdoor areas where storage devices such as bins, racks, and shelves are not available. Such areas are sometimes marked to designate locations so that objects can be placed and later found with a required degree of precision.

The present invention provides a method of determining precise position and rotational orientation (object attitude, rotation, or alignment) within a designated area or volume. Just as it is applied to vehicles, the current invention can be used on objects, people, or any stationary or moveable object that can provide the necessary electrical power and offer a view of a herein claimed position marker. Alternatively, the invention can be attached to an industrial vehicle that places objects such as storage units within an indoor are such as a warehouse. By determining the position and vehicle heading accurately, the present invention can extrapolate the precise location of the on-board storage unit; for example a pallet. Further, the invention is suitable for indoor and outdoor use, and can be applied to stationary or mobile objects to provide a high degree of precision for position and rotational orientation measurements.

BACKGROUND OF THE INVENTION

Determining the position and rotational orientation of an object within a defined space is a practical problem that has brought about many solutions, each dedicated toward solving the specific requirements of an application. Many technologies have been applied to position determination in one, two, and three dimensions, including optical, ultrasonic, and radio, but most methods do not provide angular orientation information such as attitude, direction, or heading. Other methods have been developed for angular measurement, but may lack positional determination.

For example, Global Positioning System (GPS) is a widely recognized position determination technology, but it lacks orientation determination capability for stationary objects. GPS operability suffers indoors from signal attenuation and reflections, so it is not a good choice for indoor applications. Ultrasonic methods that operate well indoors have been designed to replicate GPS' capability, but they, too, lack orientation determination.

Various optical methods are known to determine position and orientation. U.S. Pat. No. 5,832,139 discloses a method and apparatus for determining up to six degrees of freedom of a camera relative to a reference frame which comprises an optically modulated target with a camera and processing the camera's output video signal with a digital computer. The target may have a single pattern, multiple patterns, or patterns of varying size, and multiple targets may be used. The invention analyzes the parallax, or "warping" of square target patterns into non-square quadrilaterals within the field of view in order to determine six degrees of freedom of the camera. It does not present common bar code symbols as a choice for passively modulated targets, and does not use the inherent identity of bar code symbols for both automated means and non-automated position determination means.

Similar to the above reference, U.S. Pat. No. 5,828,770 provides a system for determining the spatial position and angular orientation of an object in real-time using activatable markers. Each marker is uniquely identified and marker relative geometry is known. The system allows low cost sensors to be used, but requires active markers, such that upon loss of power, the markers become undetectable by the sensor Pertaining to vehicle guidance, U.S. Pat. No. 5,367,458 discloses an apparatus and method for verifying the identity of an observed anonymous target from a plurality of anonymous targets positioned at predetermined locations within an area of operation where a guided vehicle is provided. This method offers two dimensional position and one-degree-of-freedom angular determination. Said targets are adhered to surrounding walls of the operation area, but they may become obscured in a factory or warehouse where stacks of materials may block the line of sight between detector and target.

U.S. Pat. No. 5,051,906 utilizes overhead retroreflective ceiling markers and an optical sensing means to determine a vehicle's position and orientation. Applied to mobile robots, this method includes a light source and camera that are pitched up obliquely at an angle between horizon and zenith. The markers are strip-like retroreflective features which are aligned with the axis of a hallway. In that the feature presents a pattern or alignment which is substantially parallel to a long axis of the hallway the pattern is detected and processed to derive robot navigation information. This system determines position and direction, but is aimed at directing a vehicle along a hallway, and not freely within a large area. It does not utilize self-identifying machine readable position markers.

A more sophisticated use of ceiling markers is disclosed in U.S. Pat. No. 6,556,722, wherein circular barcodes are utilized to indicate reference positions within a television studio. In this optically based method, a television studio camera is equipped with a secondary camera which views position markers set onto the studio ceiling in known locations. The markers are constructed of concentric ring barcodes which are developed specifically for the purpose. Camera position is determined by capturing an image of at least three markers and performing geometric analysis in a digital computer to determine accurate location within the three-dimensional studio space. Zoom and focus servos control the secondary camera's view and assist in marker locating. The invention discloses proprietary circular ring barcodes, which cannot be read by commercial machine vision systems, and requires a multiplicity of markers to be within view.

Three dimensional position determination is accomplished in U.S. Pat. No. 6,542,824 through the use of a portable electronic device that uses inertial sensors when GPS signals are not used. Inertial methods can provide orientation detection, but do not provide accuracy obtainable by other methods and are subject to drift through time.

In order to track vehicles indoors, a number of integrated applications have been developed wherein several technologies are used in combination to assure positional and angular measurement. For example, U.S. Pat. No. 6,859,729 discloses a combination of GPS, laser, compass, and wheel encoders to form a vehicle navigation system. Upon dropout of the GPS, the vehicle is navigated using a laser tracking system and one or both of the compass and wheel encoder detection means. The navigation system may be used to remotely control mine detection vehicles, where outdoor and indoor environments may be encountered. The system recalibrates optically with waypoint markers, and includes inertial navigation. Complexity and cost are drawbacks to implementing this method.

U.S. Pat. No. 6,732,045 detects the magnitude and angle of incremental motion vectors relating to the movement of a vehicle within a predetermined space. A plurality of sensors is used, including a laser beam with corresponding optical position markers placed at known positions and encoders which detect and encode wheel rotation and axle angular position. Vehicle position and angular orientation are determined through vector addition. Shortcomings of this invention include the assumption that wheel diameter is unchanging, that no wheel slip occurs, and that the resolution of wheel encoders is sufficient for the application. The invention requires multiple sensors, and does not provide an alternative means of determining approximate location in the event of primary system failure.

A number of machine vision-based systems exist, especially for vehicle and robot guidance, but most analyze physical surroundings by viewing downward toward floor markings, or horizontally toward local scenery or reflective markers. For example, U.S. Pat. No. 6,728,582 provides a system and method for estimating the position of an object in three dimensions using two machine vision cameras interconnected with a machine vision search tool. A nominal position for each camera's acquired image of the object is determined and a set of uncertainty vectors along each of the degrees of freedom is generated. This method requires viewing multiple objects with multiple cameras in order to make the weighted estimation.

Rotational orientation determination is not present in many position determination methods, and becomes important in applications such as vehicle tracking and vehicle guidance in order for a guidance system to properly direct the vehicle. Considering materials handling applications, goods may be stored in chosen orientations, for example with carton labels aligned in a particular direction or pallet openings aligned to facilitate lift truck access from a known direction. The combination of position determination and angular orientation determination using a single sensor is therefore desired. An improved method and apparatus must reduce or remove the shortcomings of current methods, provide general applicability, and offer high accuracy.

SUMMARY OF THE INVENTION

The present invention provides a method and an apparatus for accurately determining position and rotational orientation within a predefined space, such as a designated area or volume inside a building. The present invention can be employed to determine location in one or two dimensions and rotational orientation in one degree of freedom. It can be applied to stationary and/or mobile objects and can measure the objects position and orientation in real-time as it moves freely within the designated area.

The present invention, which is based on a single optical sensor, overcomes line of sight obscuration problems by providing position markers placed opposite the plane of the object's motion. In the example of a factory, office, or warehouse, the plane of the object's location is typically a floor, and position references are placed overhead.

The present invention provides a reliable and accurate method and apparatus that can be used in many situations. It is suitable for stationary or mobile objects, slow or fast motion, incremental or continuous measurement, indoor or outdoor use, and can serve as the sensory apparatus and method for a guidance system, navigation system, or position monitoring system. While the specific purpose is to track industrial vehicles indoors, it can be applied to track objects of almost any sort, including railcars, heavy equipment, storage containers, people, animals, and so on. It can also be applied to map the location of marked objects in designated areas such as archeological sites, excavations, outdoor storage areas, and mines.

The method of the present invention determines a coordinate position and rotational orientation (i.e., directional heading) of an object within a predefined coordinate space. The method comprises the steps of:

providing a plurality of unique position markers having identifying indicia and positional reference indicia thereupon, the markers being arranged at predetermined known X, Y, and Z coordinate positional locations within the coordinate space so that at least one position marker is within view of the object;

maintaining a look-up-table comprising actual X, Y, and Z coordinates and rotational orientation of all position markers within the coordinate space;

using an image acquisition system comprising a camera mounted on the object, acquiring an image of the at least one position marker within view;

processing the image to determine the identity, the coordinate position relative to the object, and the rotational orientation relative to the object of each position marker within view;

determining and selecting the position marker nearest to the center of the image;

determining an approximate position of the object by retrieving the actual X, Y, and Z coordinates and rotational orientation of the selected position marker from said look-up-table; and using the selected position marker, calculating the coordinate position of the object and the rotational orientation of the object in the coordinate space and storing the position and the rotational orientation information in a memory.

In one embodiment, the step of calculating the position of the object and the rotational orientation of the object in the coordinate space further comprises:

identifying two key points in the position marker;
defining a line between the two key points;
calculating the length of the line;
determining the center of the line to define the center of the position marker;
determining a vector from the center of the image to the center of the position marker;
determining a length and angle of this vector relative to the field of view by plane geometry; and
calculating an actual position of the object by correcting the approximate position of the object by using the length and angle of the vector to calculate a position offset,
wherein the Z coordinate position of the object is determined from the length of the line between the two key points and the Z coordinate of the position marker, by calculating the proportional distance between the camera and the position marker by scaling the line length into units of actual space.

Position and rotational orientation are determined by acquiring images of position markers which are placed at known locations in or near the coordinate space, i.e., the region of interest. Subsequent image analysis is performed by commercially available machine vision equipment consisting of one or more cameras and image processing system(s). The position and rotational orientation of one or more position markers relative to a camera's view are determined by the machine vision equipment; the position and rotational orientation in "real" space are then computed from machine vision data using a series of programmed instructions which translate the relative positional and rotational orientation data to coordinates expressed in usable units such as feet or meters. Results are stored, displayed, and/or transmitted to another system, such as a post processing system, where data may be used to record object location, to direct vehicle guidance, or for other navigation or control purposes.

Embodiments of the present invention are also directed to an apparatus useful for determining a coordinate position and rotational orientation of an object within a predefined coordinate space. The apparatus comprising:

a plurality of unique position markers arranged in at predetermined positional locations within the coordinate space such that at least one position marker is within view of the object, wherein each position marker comprises a substantially planar material imprinted with an asymmetric pattern which encodes the identity and angular orientation of the position marker;

an image acquisition system mounted on the object, for acquiring an image of at least one position marker within view;

an image processing system for processing pixels in the acquired image to determine the identity of each position marker within view, the position of each position marker relative to the object, the rotational orientation of each position marker relative to the object; and a post processing system for calculating the position of the object and the rotational orientation of the object in the coordinate space.

In some embodiments, the image acquisition system comprises a machine vision system, the machine vision system comprising a camera, a light source, and image capture electronics wherein the light source of the machine vision system is located adjacent to the camera.

BRIEF DESCRIPTION OF THE DRAWINGS

FIG. 7 shows a sample Look-Up-Table containing position marker data.

FIG. 16 shows a sample Look-Up-Table containing position marker data.

DETAILED DESCRIPTION

Figure 1:
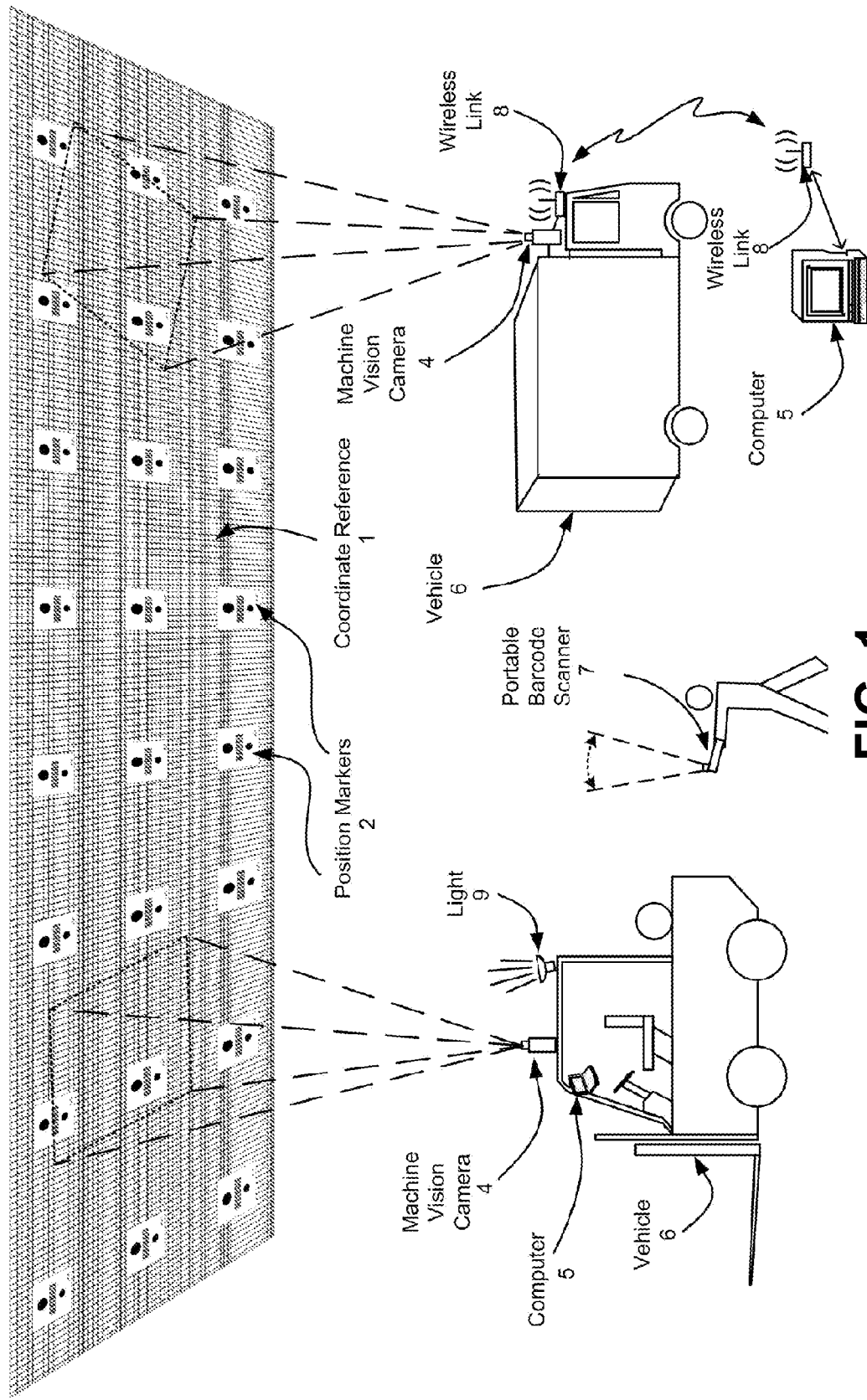
FIG. 1 shows the overall system in one embodiment in accordance with the present invention and identifies key elements coordinate reference 1, position markers 2, machine vision camera 4, data processing device 5, vehicles 6, handheld bar code scanner 7, wireless data communications links 8, and illumination source 9.

The present invention provides a novel method of determining position and rotational orientation through the following steps:

1. The determination of position and rotational orientation in a designated area is accomplished by contemporary machine vision equipment using a coordinate reference, comprising a plurality of unique position markers, which is placed within or near to the designated area or volume. Sufficient position markers are provided so that at least one position marker of the coordinate reference is visible to the determination system from each and every location within the designated area or volume.

2. Machine readable symbols, such as one-dimensional or two-dimensional barcodes, encode the identity of each position marker of the coordinate reference, allowing bar code scanning devices 7 (FIG. 1) to read the identities of the symbols in addition to, or in lieu of the current invention's automated system. Position data in human readable form (text) may also be imprinted, attached, or otherwise affixed to the position markers if desired. Printed text allows determination of approximate location by simply viewing the coordinate reference and reading the text on the nearest position marker.

3. Machine recognizable symbols are arranged on the position markers of the coordinate reference at predetermined positions, allowing machine vision technology to determine position by analyzing the shapes and symbols on the position markers. Exact position coordinates and rotational orientation are determined through computer programmed instructions which are based upon geometric analysis of acquired image data.

4. In one embodiment, two-dimensional non-symmetric, non-concentric barcode symbols are utilized to serve the dual purpose of machine readable position location codes and geometric position markers.

Coordinate reference 1 is not required for the invention, but may provide physical support for position markers if no other structures such as ceilings, beams, walls, etc. are available for direct attachment of the markers. The coordinate reference may be constructed of any of several air-permeable or perforated materials (example: netting) or solid materials (example: plastic sheet). Netting examples include fish net, basketball net, fence net, screen (window screen, tent screen), and mesh (examples: garment lining, landscaping mesh). Solid materials include sheet or webs such as polyolefin film, non-woven synthetic material, and paper. Perforated or permeable materials offer the advantage of allowing air to pass through, for example, to accommodate indoor ventilation. Perforated, transparent, and translucent materials offer the advantage of allowing light to pass through the coordinate reference, for example to allow room lighting to be transmitted. Solid materials, which may also be perforated (example: paper with punched holes), may be used and may be opaque, translucent, or transparent, depending on lighting and ventilation requirements for the application. Either solid or perforated materials can be readily used to implement the invention. The coordinate reference is sized to match the predefined space, volume, or area to be controlled. The purpose of the coordinate reference 1 is to simply provide a convenient surface on which a plurality of unique position markers 2, 3 can be imprinted, attached or affixed. Lacking a coordinate reference, position markers may be applied directly to a ceiling, roof, wall, beam, or other structure, or may be suspended, supported, or attached to nearby structure.

The coordinate reference may be supported by building structure, for example, by factory or warehouse ceiling beams if the coordinate reference is to be suspended overhead. Free standing fixtures or other fixed structure may be used for other orientations; for example, the coordinate reference may be attached to a wall parallel and opposite to a wall on which objects are desired to be tracked. In some cases, position markers may be attached directly to building structures without the necessity of affixing them first to a secondary surface.

Position markers 2 and 3 are constructed from any material on which printing can be done directly or can be applied, as a label. Mechanical sturdiness is an important factor for assuring marker longevity, and many materials offer adequate printability and sturdiness. Paper, sheet goods, plastic sheeting, cardboard, metal, and other common materials are suitable. The markings can be dark on a light or transparent background, light on a dark or opaque background, or of one or more colors. Marker attachment to the coordinate reference may be by fasteners such as screws, clips, or wire ties, adhesives such as glue or pressure sensitive label adhesive. Alternatively, the position markers can be imprinted directly on the coordinate reference using silkscreen, lithographic, or offset printing methods. The coordinate reference may be substantially planar or non-planar. It is necessary only that each marker has a unique identity and that the position, orientation, and size of each marker relative to the designated area is known.

Figure 3:
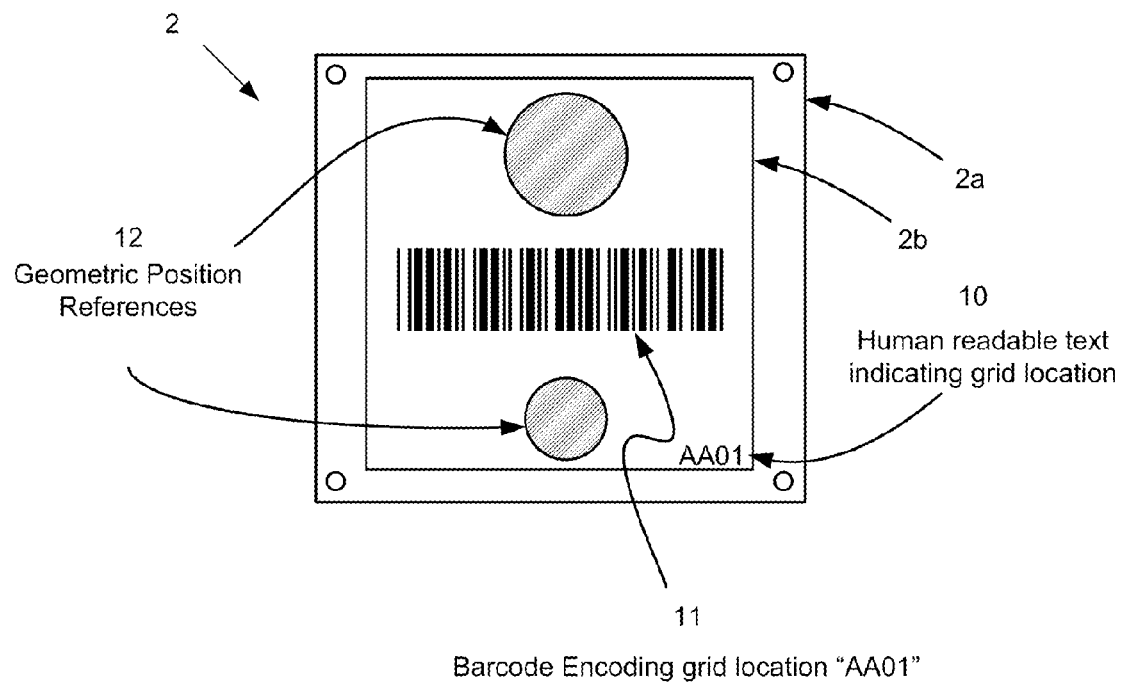
FIG. 3 illustrates details of position marker 2, showing substrate 2a, label 2b, and imprinted upon the label geometric position references 12, linear bar code symbol 11, and human readable marker identification 10.

Position markers are imprinted upon or attached to the coordinate reference 1 in a prescribed pattern; for example, in rows and columns corresponding to a desired coordinate plan for the designated area. Position marker 2 shown in FIG. 3 contains three components; text 10 to aid manual identification of each grid location (example: "AA01"=Row "AA", Column "01"), a one-dimensional (linear) barcode 11 which encodes the marker location "AA01" in any of several common bar code symbologies; and geometric position references 12 which serve as position and angular orientation references, or optical targets, for the machine vision system.

It may be desirable in certain instances for the position markers to be read by humans, or to be scanned by bar code scanners. These alternative methods offer assurance that position information can be determined even though the automated method of the present invention is inoperative, for example, during a power failure. Linear bar codes 11 in position marker 2 are selected for these implementations.

Figure 12:
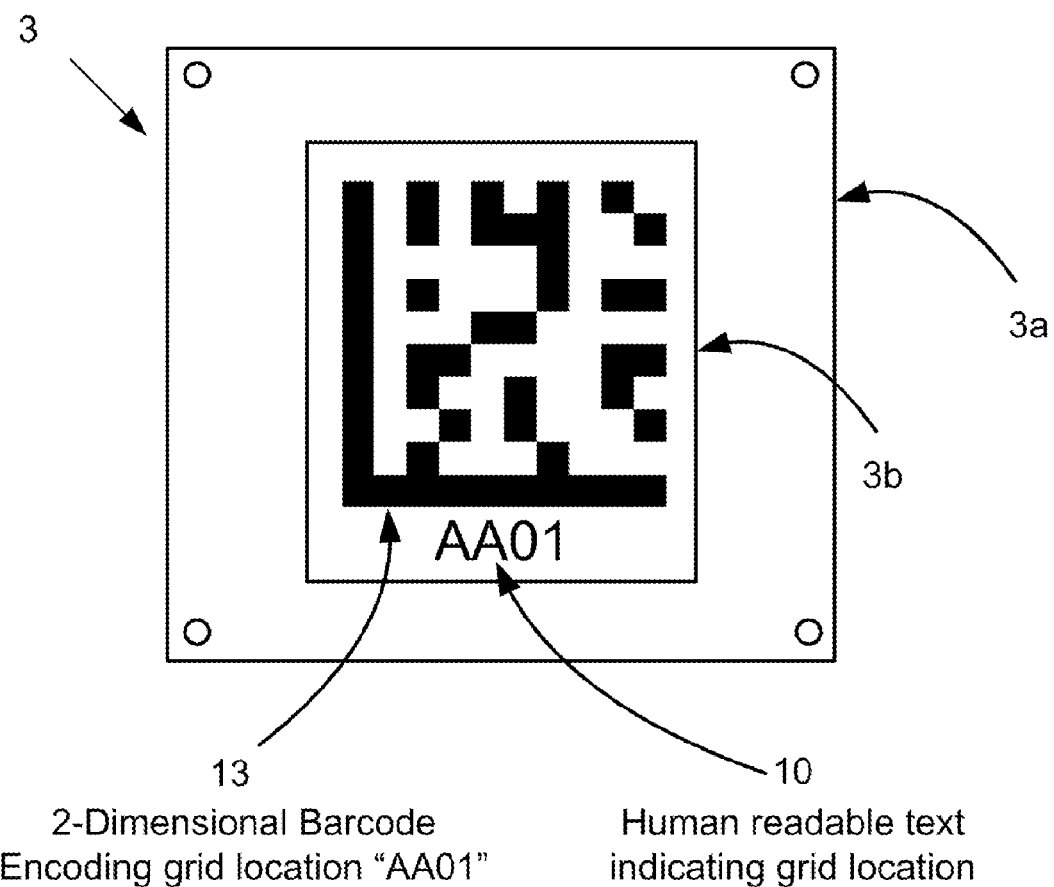
FIG. 12 shows position marker type 3 with a two-dimensional bar code symbol 13, substrate 3a, label 3b, and human readable text 10.
Figure 13:
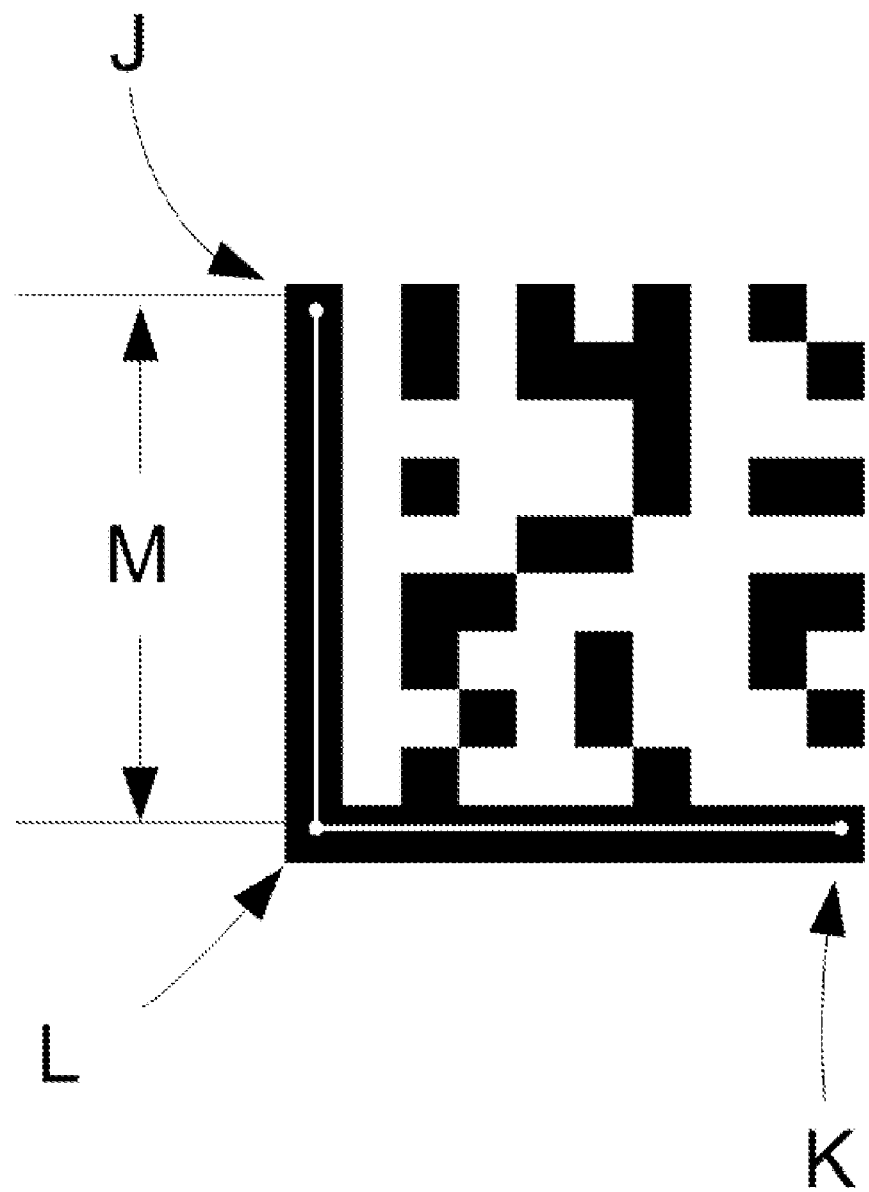
FIG. 13 defines key points J, K, and L of position marker 3.

The position marker 3 of FIGS. 12 and 13 provides information equivalent to that of position marker 2, but does so with a single graphic; in this case, a two-dimensional bar code symbol. The marker is comprised of text 10, and barcode 13, which serves the dual purpose of encoding the marker identity and, due to its non-symmetric form, serving as a position and angular orientation reference.

Contemporary machine vision technology is utilized to capture and process images of the coordinate reference and position markers. Offering sophisticated image processing capabilities such as presence or absence detection, dimensional measurement, and object shape identification, machine vision systems are typically comprised of a video camera, a computing device, and a set of software routines. Machine vision equipment is commercially available and suitable for most environments. In order to develop a machine vision application, the user chooses certain subroutines, combines them into a sequence or procedure, and stores the procedure in the memory or storage device of the machine vision computing device. The present invention includes a set of software instructions that calls certain procedures to capture images, adjust images for readability, analyze images to detect features, and measure detected features to determine geometric data such as object size or location within the camera's field of view. Output data are produced at the conclusion of each procedure and may be stored or transferred to another device.

The present invention provides a second computing device to (a) calculate the object's position with high precision, (b) calculate the object's rotational angle with high precision, (c) compensate for position marker installation inconsistencies, and (d) translate position and orientation values into convenient units.

DESCRIPTION OF THE PREFERRED EMBODIMENT

Referring to FIG. 1, the preferred embodiment of the invention will now be described in detail. The coordinate reference is made from thermoplastic flat net such as CintoFlex "D", available from Tenax Corporation. Designed to prevent deer from entering highways, the material is lightweight, strong, and inexpensive. The net is cut to the dimensions sufficient to cover the area of interest; for example, it can be cut to the size of a storage area. Multiple nets can be adjoined side by side to cover large areas. Alternatively, the net can be cut into strips wide enough to support rows of position markers, whereby each strip spans across a particular area within a building, and the strips are suspended in parallel with one another.

Position markers 2 are fabricated of two components; a label 2b and a backing plate 2a. Labels are printed using common bar code label printers such as the Intermec Model 3600 Thermal/Thermal Transfer printer. Label stock such as Duratran II Thermal Transfer Label Stock, part No. E06175, also available from Intermec Corporation, is available from many suppliers. Bar code symbols, each containing a unique identification encoded in 1-D bar code symbology are printed on the label stock, along with human readable text. Bar codes of most standard formats are usable; for example, Code 39, Code 128, CODABAR, UCC/EAN128, and Interleaved Two-Of-Five (ITF) codes are common. The labels are then adhesively affixed to a stiffer substrate, or backing plate, 2a, to add mechanical strength. Many materials can be used for backing plates, but for its low cost and ease of use, white 0.030 inch thick PVC (polyvinyl chloride) is a good choice. The backing plate is sized larger than the label to provide an optical quiet zone around each bar code symbol. Attachment of the backing plate to the coordinate reference net can be done in many ways, using staples, glue, weldments, etc., but is preferably done with plastic wire ties. Attachment is done by inserting tie into holes which have been punched or drilled in the backing plates, and threading the ties through the net.

FIG. 1 illustrates a typical embodiment in a warehouse, where materials are stored on the floor. Coordinate reference 1, based on the net/screen/mesh design is suspended from overhead, and is placed sufficiently high above the working area so as not to interfere with operations. Suspension is provided by mechanical supports such as cables, wire, or building structure (not shown), or the reference is attached directly to the ceiling, whereupon the material assumes a substantially planar form. The semi-open structure allows much light to pass from overhead light fixtures to the work area, and air to flow freely for heating and ventilation considerations.

Position markers 2 on coordinate reference 1 identify coordinate locations. After being installed in the warehouse facility, the markers remain stationary. Each marker therefore corresponds to a particular location on the warehouse floor, and a database of these locations is created and stored in a computational device (digital computer) 5. The data base may be generated in advance of coordinate reference installation, and populated with expected values. It may be modified after installation if a physical survey determines that discrepancies exist between expected values and actual values for marker locations, rotation angles, or dimensions. Markers commonly share uniform dimensions, but some applications may require markers of different sizes. Image analysis routines are presented to correct for varied marker size or varied distance from the camera to the markers.

Vehicles 6 have affixed to them machine vision cameras 4. Illumination source 9 may be required for dark operations such as in dimly illuminated warehouses. The light source may be a spotlight, floodlight, strobe, LED, or other conventional source. The preferred embodiment utilizes room lighting. Computer 5 can reside on-board as shown on the fork lift truck of FIG. 1, or be out boarded as shown on the van. Standard commercial wireless data communication network equipment 8 provides data transmission between vehicles not equipped with on-board computers and a computer 5 stationed remotely.

In this example, the vehicles have freedom of motion in two dimensions within the operating area; therefore, the invention embraces two-dimensional analysis, plus single degree-of-freedom rotation (heading) determination.

The position and rotational orientation determination system is active at all times when the vehicle is within the designated area beneath position reference 1. Camera images may be captured continuously, or on command, such as when the vehicle stops, or at a time chosen by the operator. When the camera 4 captures an image of the overhead position reference 1 the image is transmitted to the machine vision system computational device 5 for analysis.

Image Analysis

The method of the preferred embodiment utilizes callable vendor-supplied subroutines to analyze position markers and store data obtained from the analysis. Rotational orientation and position are calculated from these data and stored or transferred to other devices.

The preferred embodiment applies a commercial machine vision system such as Model 5100 or Model 5400 from Cognex, Incorporated. "In-Sight Explorer™" software provided with this system offers a wide array of feature extraction, mathematical, geometric, object identification, and barcode symbol decoding subroutines.

The following functional steps analyze the image within the field of view, identify position markers, decode the position markers' encoded position information, calculate X-Y coordinates in pixel space, and convert the results to actual position and heading.

Image Processing—Brief Description

Figure 8:
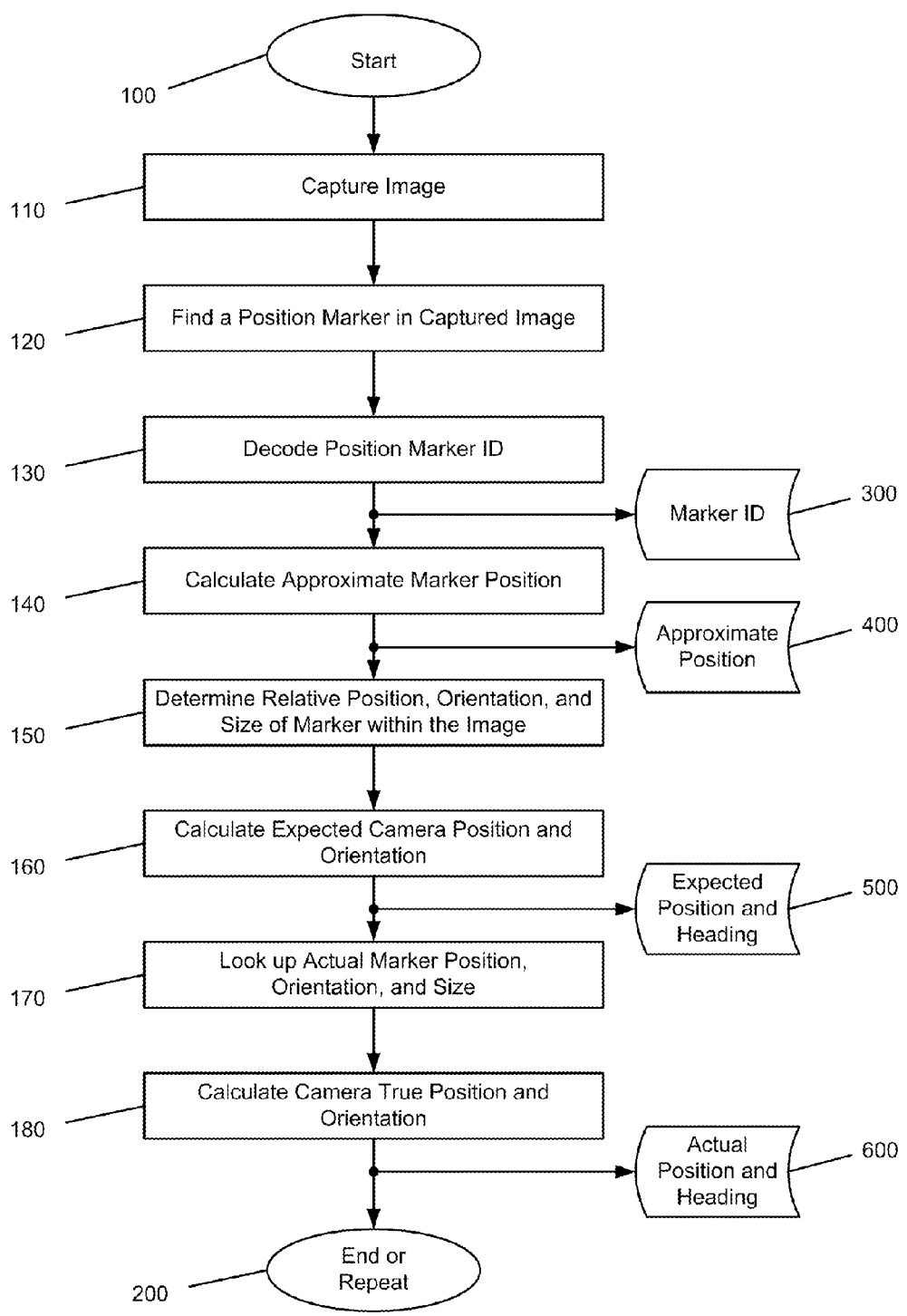
FIG. 8 presents a high level software flow diagram for the general solution using marker type 2.
Figure 9:
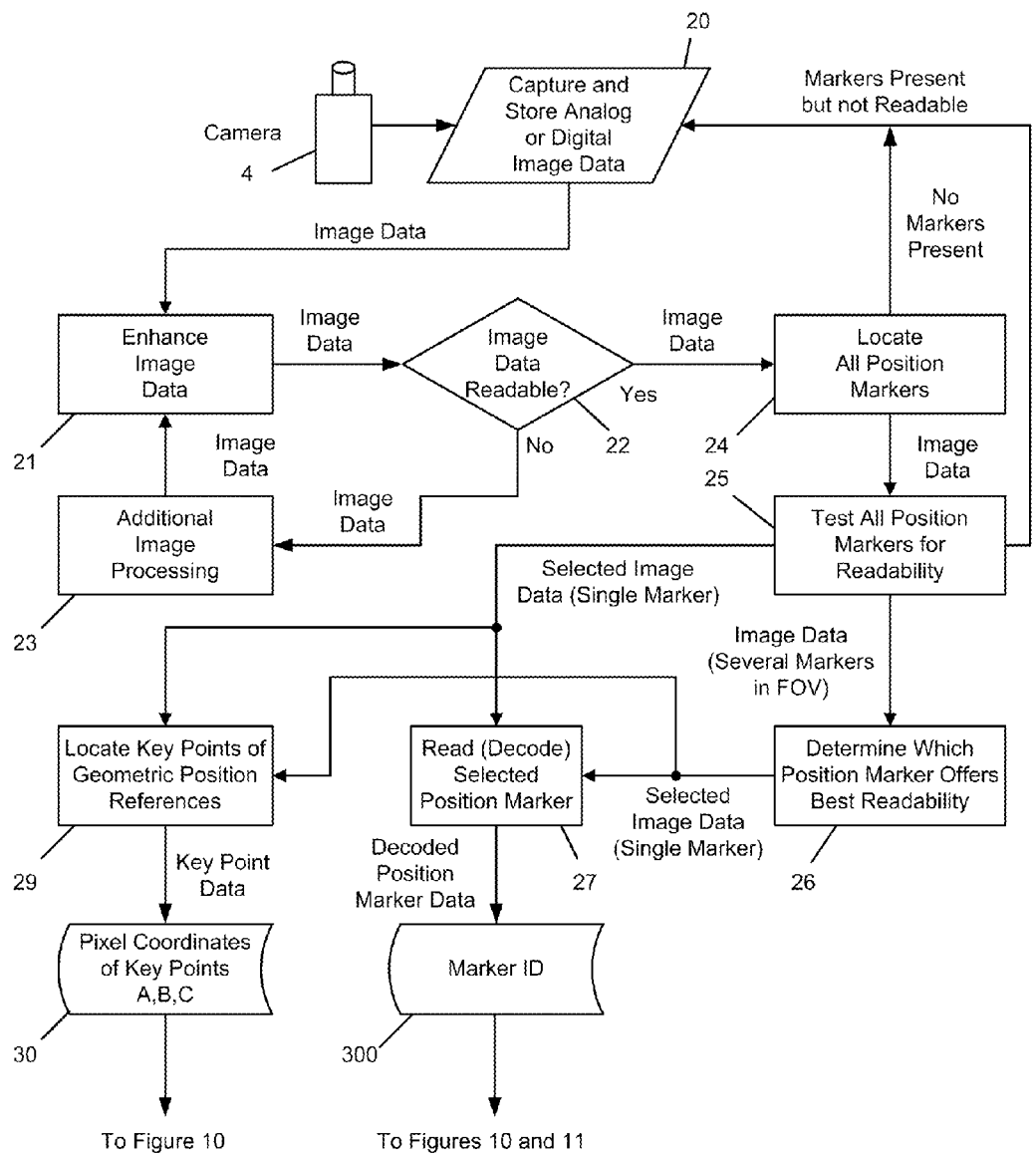
FIG. 9 presents a software flow diagram for image processing and feature extraction steps.

FIG. 8 presents a condensed flow diagram. The process produces four separate sets of data: marker ID 300, approximate position 400, expected position and heading 500 and actual position and heading 600.

Upon internal or external command, an image is captured 110 by the machine vision camera and stored into its memory. Analysis begins by locating 120 a readable position marker image (image in which the bar code can be decoded) within the field of view. In normal circumstances and by design, at least one position marker will be present within the field of view. Once a marker has been located, the marker identification is decoded 130 and the data is stored in the machine vision system memory 4 and is available as an output 300. Marker positions are stored in a look-up table (FIG. 7) in computer 5, and the table can be accessed to return the approximate camera position 400. In other words, by knowing that the camera is viewing a particular marker we can place the camera within the approximate region of that marker.

Markers may be directly encoded with position information, or they may be serially encoded with non-meaningful "license plate" numbers. Direct encoding allows the decoded ID to translate directly into real coordinates; for example, marker 100250 may be encoded to mean "100 feet south, 250 feet west". Approximate position 400 is calculated in this manner, based on decoded marker ID and a transformation scalar to convert pixels into feet. Serial encoding may be chosen whereby the ID has no inherent meaning and a look-up table contains references to the actual position.

The image is next analyzed 150 to determine the relative location, orientation, and size of the marker within the field of view. The marker's angular orientation and its azimuth from the center of the field of view are calculated and stored in degrees. Expected position and orientation can then be calculated 160 using plane geometry for markers that directly encode position. This step cannot be done for serialized markers unless the look-up table of FIG. 7 is accessed. Expected position and heading 500 assume the marker's position and orientation are exactly where the encoded value places it. Actual values may differ if the marker is installed slightly offset its intended location or orientation.

Marker ID, relative position within the field of view, angular orientation, and marker dimensions are passed to a second processor 5. The decoded ID serves as a key to access true marker position data 170, which is obtained from a lookup table in the second computer. The marker's actual position is then calculated 180 from the marker's position within the field of view; that is, how far from the center of the field of view, and at what azimuth, as in step 160, but using actual positional and orientation values. The results are transformed from pixels into real dimensions such as feet or meters. The results 600 can be saved and/or conveyed to other devices for storage, presentation, or other purpose. The cycle repeats 200 once a full determination has been made.

A complete description of image processing steps follows.

Image Capture and Marker Identification (100, 110, 120, 130, and 300)

Referring to FIGS. 8, 9, 10, and 11, the following steps take place within the machine vision software.

Figure 4:
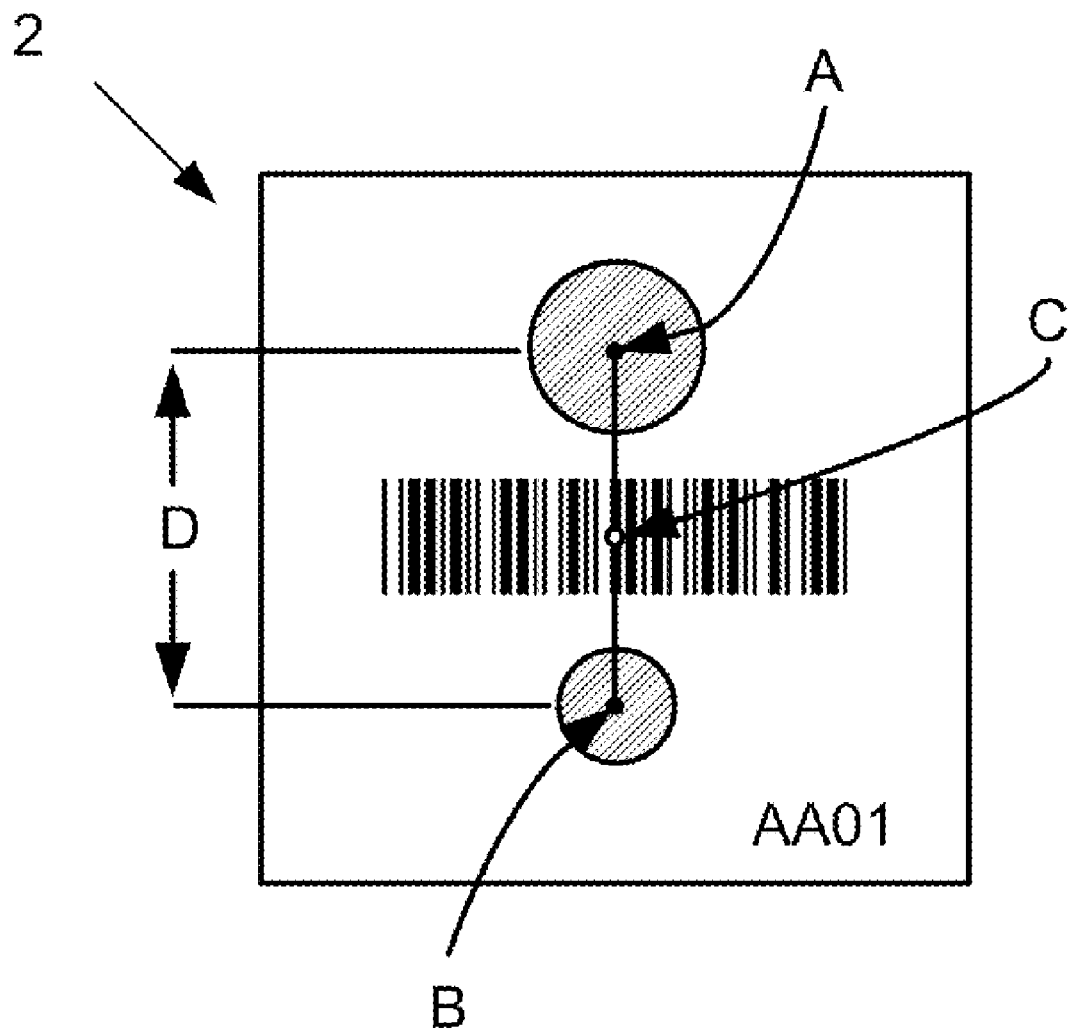
FIG. 4 defines key points A and B, point C (the midpoint of line AB which defines the center of the symbol), and dimension D of position marker 2.

The machine vision camera 4 continuously, or on command, captures analog and/or digital images of the position markers 2 of the coordinate reference 1. One or more position markers 2 are partially or fully visible within the camera's field of view at any given time. Once an image is captured, the software analyzes it as follows:

Image data 20 is manipulated by preprocessing routines 21 to enhance image features such as sharpness, contrast, and brightness. The resulting processed image is tested 22 for image brightness and contrast. The image is returned for additional processing 23 if not adequate for interpretation. Once the image has passed preprocessing, it is analyzed 24 to locate all position markers. This stage determines whether single or multiple position markers appear within the field of view, and superfluous image data such as position marker printed text and background objects and the coordinate reference net are ignored. Position markers found fully visible within the field of view are analyzed for readability 25 to determine if the bar code associated with the marker can be decoded. If a single marker is found, selected image data are passed to a decoder 27; if multiple markers are present, image data are passed to a readability test 26, which determines which marker is most readable and passes the selected image data to the decoder 27. Alternatively, the readability test may select the marker closest to the center of the image and pass that image data to the decoder 27. Decoder 27 "reads" the encoded unique identification code of the position marker and returns alphanumeric data which are stored as decoded position marker identification data 300. An example of an encoded one-dimensional bar coded position marker is shown in FIG. 4. Selected image data for a single marker are also passed to position marker key point locator 29 which analyzes image data to locate key points A, B, and C of the position marker symbol (FIG. 7). Key points are then stored 30 as pixel coordinates.

In the case of position marker 2 of FIG. 4, having a one-dimensional barcode, the locating mechanism 24 first finds bar codes within the field of view; then steps 25 through 27 proceed to decode the barcode. "Blobs" (contiguous dark areas on light backgrounds) nearest to the chosen bar code are located, and the centers of the blobs are determined. Since one blob is always larger than the other for any given marker, the areas of the two are calculated and compared. The key points for the position marker are defined to be the centers of the circular position references 12.

Approximate Position Determination (140, 400)

Figure 10:
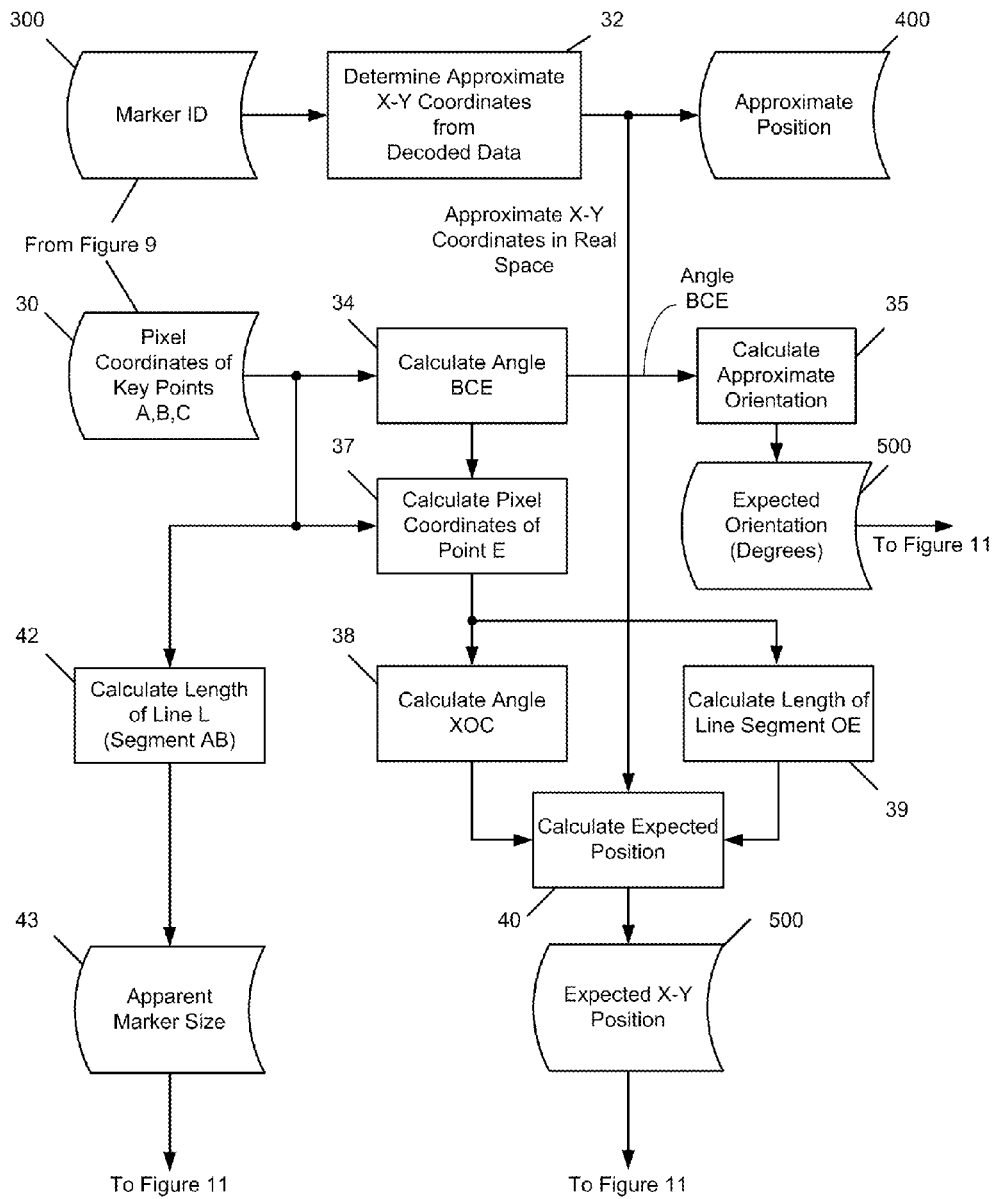
FIG. 10 shows a software flow diagram for expected position and rotational orientation determination.

Referring to FIG. 10, the following steps begin after completion of image processing and feature extraction steps. Marker identification can be translated directly into real X and Y position data for markers that are directly encoded. As earlier illustrated, marker ID 100250 might translate directly as "100 feet south and 250 feet west". Having this marker within the field of view implies that the camera (object) is somewhere near this point, but not necessarily exactly at this point. With markers spaced ten feet apart, the camera and object would probably lie within half-marker spacing, or five feet. Object orientation is not determined.

Expected Position and Orientation Determination (160, 500)

Figure 5:
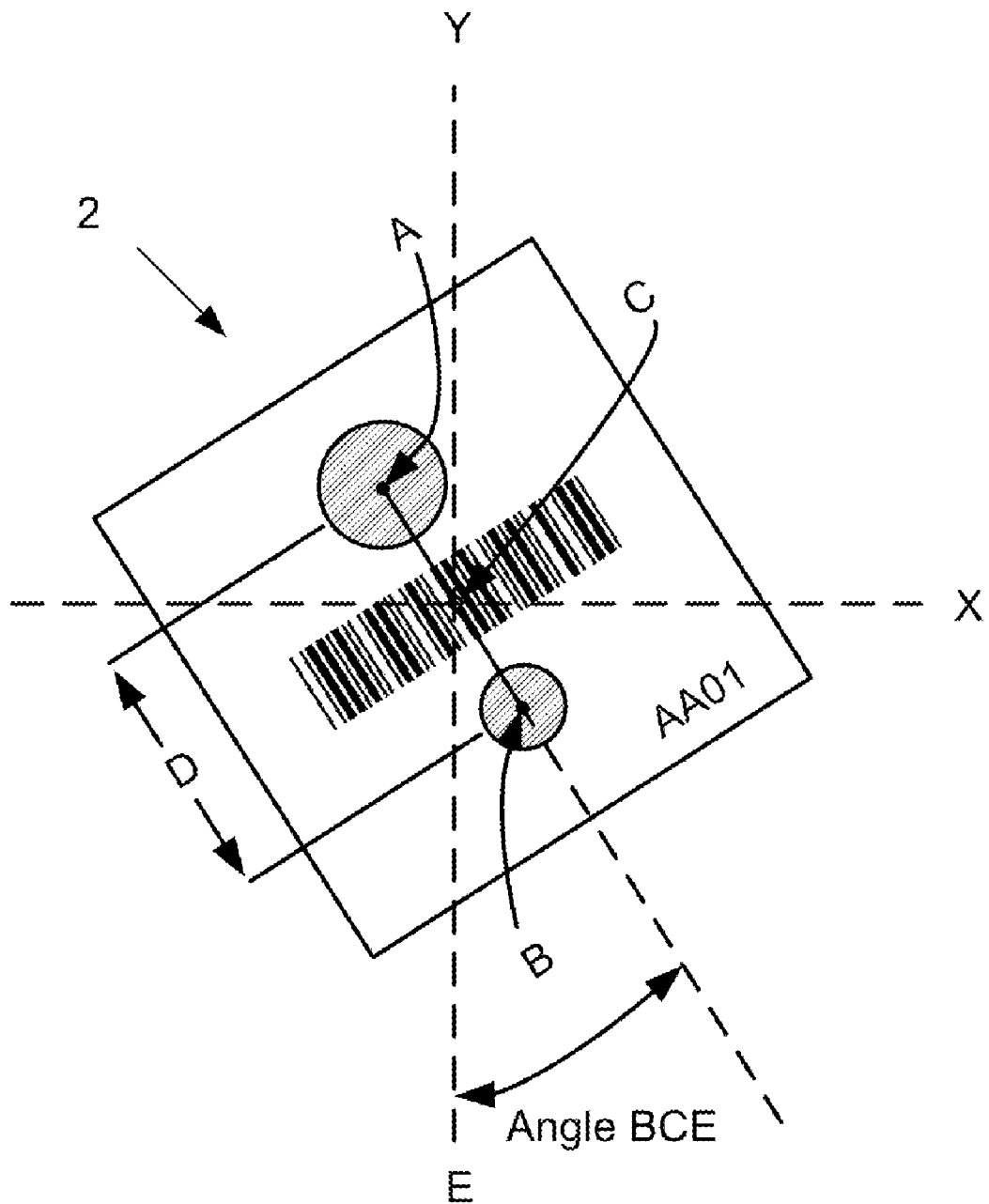
FIG. 5 shows position marker 2 rotated counterclockwise with respect to Cartesian coordinate axes X and Y and defines angle BCE as the angle of rotation.
Figure 6:
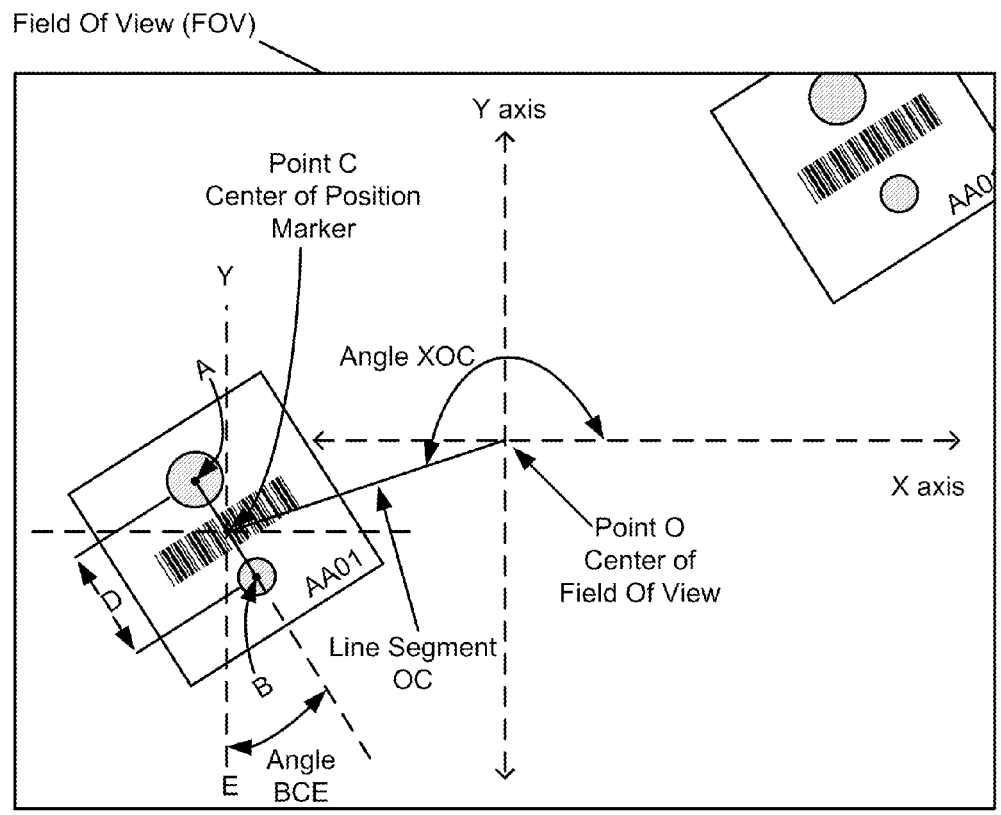
FIG. 6 shows a camera's field of view with one entire position marker and one partial position marker in view. The distance between the center of the field of view (point O) and the center of the position marker (point C) is defined as line segment OC. Angle XOC is defined as the radial angle from the X axis to the position marker.

Referring to FIGS. 5, 6, and 10, and applying only to directly encoded markers, a geometric analysis of the marker's position and rotation relative to the field of view can more accurately determine the camera's position and orientation. Pixel coordinates of Key Points B and C, 30, are used to calculate angle BCE, 34, the rotation angle of the position marker relative to the field of view.

Angle BCE is illustrated in FIG. 5 and shown in the camera's field of view in FIG. 6. X and Y values of pixel coordinates A and C, 30, are summed and divided by two (37) to establish Point E (FIG. 10), the midpoint of line segment AC, and the center of the position marker. Point E coordinates are used to calculate: (a) angle XOC, FIG. 11, the radial angle between the center of the image and the center of the position marker; and (b) the length of line segment OC, which is equal to the radial distance from the center of the image (center of the camera), Point O, to the center of the position marker, Point E. Once these two values have been established, it is possible to calculate 40 a more accurate X, Y camera position using plane geometry. The "expected position" is therefore an accurate calculation based on the expected position and orientation of the marker.

Actual Position and Orientation Determination (170, 180, 600)

The Position Marker Look-Up Table 31 (FIG. 7) is a database containing actual X, Y, and Z coordinates and rotational orientations that have been measured and recorded for all position markers at the time of the coordinate reference installation. Coordinate values are recorded in conventional units, such as feet, meters and degrees. In this embodiment, and referring to FIG. 2, the coordinate reference (leftside of drawing) includes markers AA01, AA02, etc. X values correspond in the example to the north/south coordinate; Y values to east/west coordinate; Z values to marker height above the floor, θ values correspond to the difference between the marker's rotational angle and its nominal angle, and the size value records the marker's dimensions referenced to the length of line segment AB.

Actual orientation is calculated 44 as the sum of the expected orientation and the look-up table value of θ. Actual position is recalculated 46 exactly as in steps 150 and 160, but using look-up table data instead of expected (assumed) X and Y data.

Apparent marker size 43 is applied as an adjustment factor in calculation 46 for markers whose dimensions differ from nominal.

Figure 11:
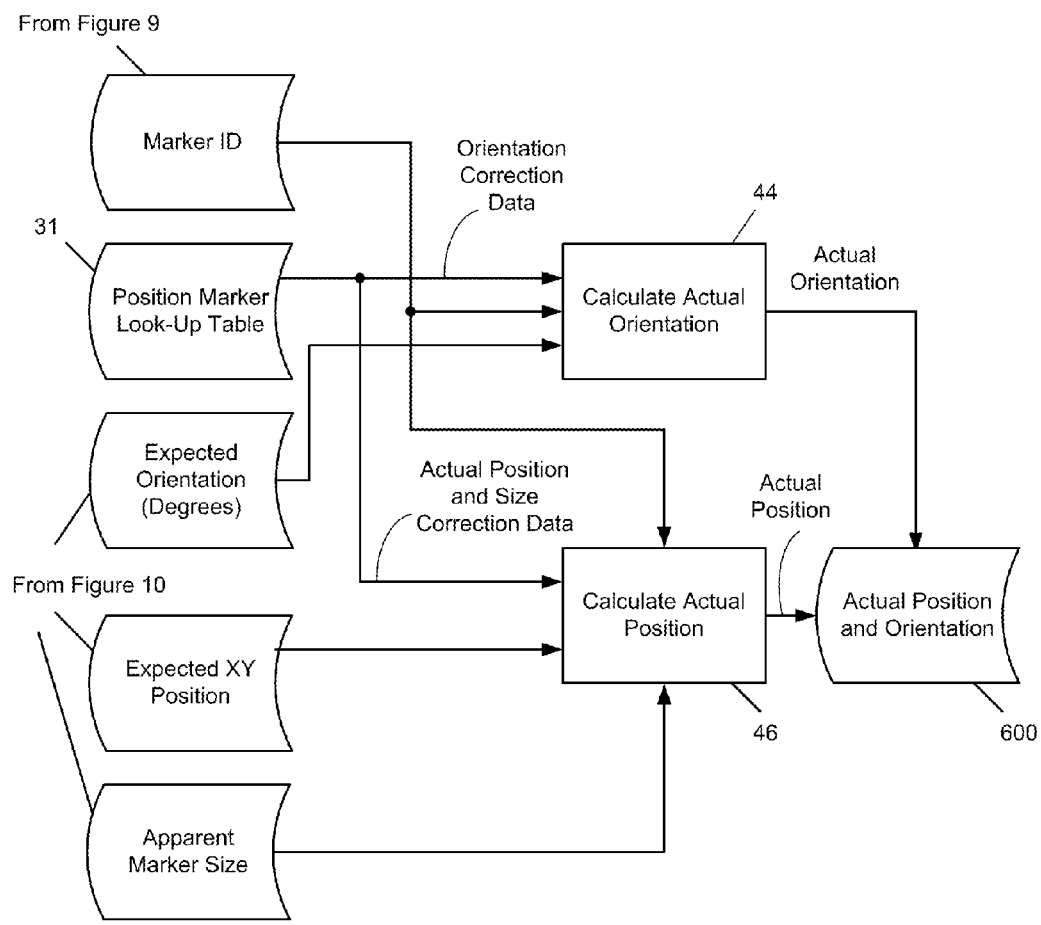
FIG. 11 shows a software flow diagram for the calculation of actual position and rotational orientation.

Decoded marker ID 300 is used in FIG. 11 to search look-up table 31. The results of this calculation are stored in memory. To determine the Z coordinate and position, Key Points A and B are used to calculate the length of Line Segment AB of the image. Since the distance AB on the position marker 3 is known and the focal length of the lens of the camera 4 is known, the distance from the camera 4 to the position marker can be determined from the ratio of the length of Line Segment AB in the image to the distance AB on the position marker 3. With the Z coordinate of the position marker 3 also known, the Z coordinate of the object may be readily calculated. The Z coordinates are stored in memory.

The final step is the calculation and combination 46 of actual rotational orientation and X and Y coordinates into a single unit of data which can be stored in local memory or transmitted to other devices. Rotational orientation and position data derived from the image processing steps may be optionally transformed into alternate units to indicate specific regions such as a zones, sectors, or areas.

Description of the Second Embodiment

Figure 2:
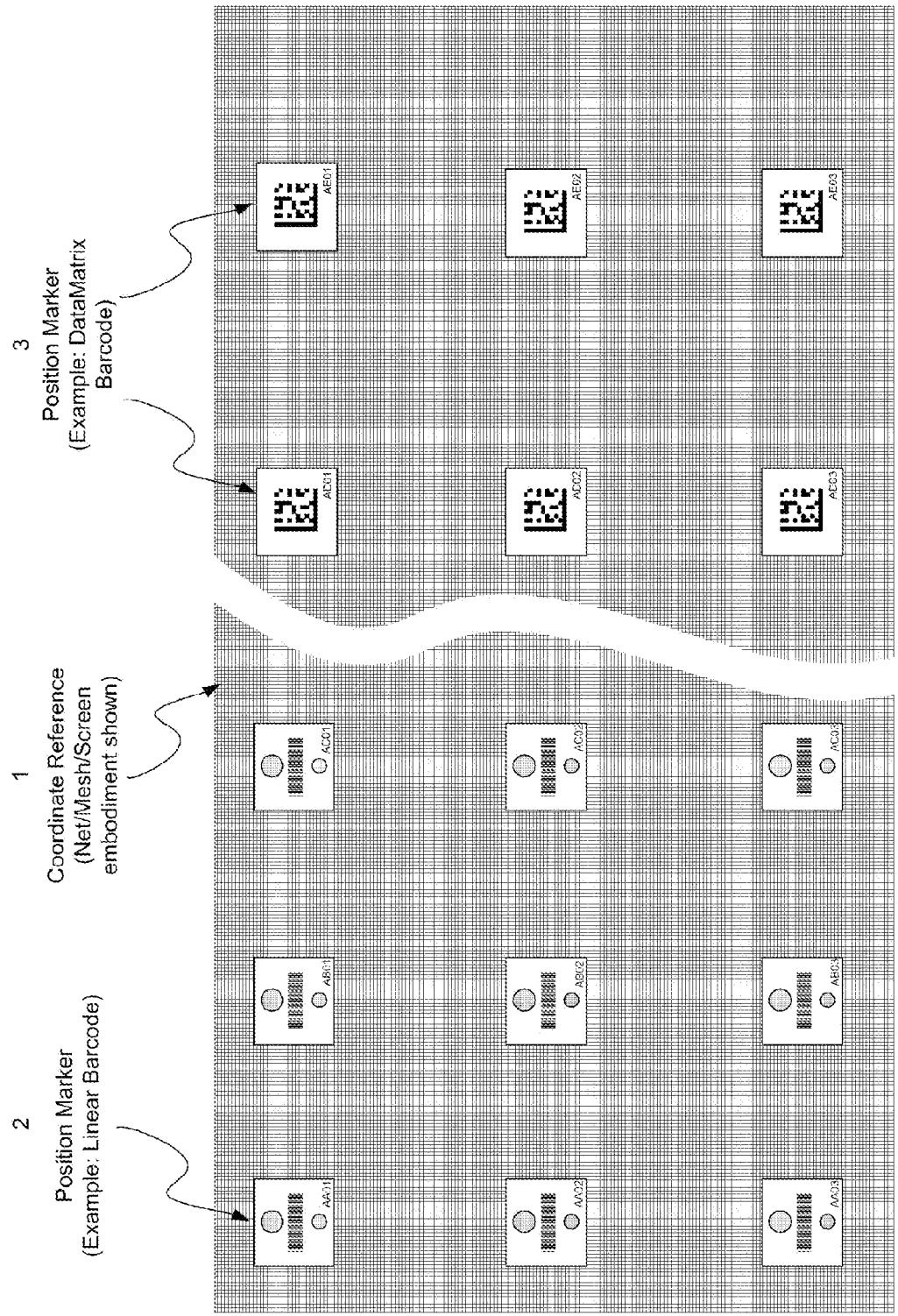
FIG. 2 illustrates two implementations of coordinate reference 1, showing arrays of two types of position markers: type 2 (employing linear bar code symbols) on the left drawing half, and position markers type 3 (employing two-dimensional bar code symbols) on the right drawing half.

Referring to FIGS. 1 and 2, a second embodiment will now be described. Steps omitted are assumed to be unchanged from the preferred embodiment. This embodiment utilizes two-dimensional bar codes. Coordinate reference 1 consists of position markers 3 (FIG. 12), which are fabricated of labels 3b and substrates 3a. Bar code symbols, each containing a unique identification encoded in two-dimensional bar code symbology are printed on the label stock, along with human readable text. Bar codes of standard formats can be used including DataMatrix, Code One, PDF417, Array Tag, and QR Code. DataMatrix symbols are chosen in this embodiment for their ubiquitous usage, error correction robustness, and well developed suite of image processing software available in commercial machine vision systems.

Image Capture and Marker Identification (100, 110, 120, 130, and 300)

Referring to FIGS. 1, 8, 17, 18, and 19, the following steps take place. The machine vision camera 4 continuously, or on command, captures analog and/or digital images 20 of position markers 3. At least one marker is fully visible within the camera's field of view at any given time. Once an image is captured, the software analyzes it as in the preferred embodiment for steps 21 through 27. The chosen marker is analyzed to locate key points J, K, and L, which are defined in FIG. 13. Key point coordinates are stored 30 for each point, and marker ID is decoded and available as an output 300.

Approximate Position Determination (140, 400)

Figure 18:
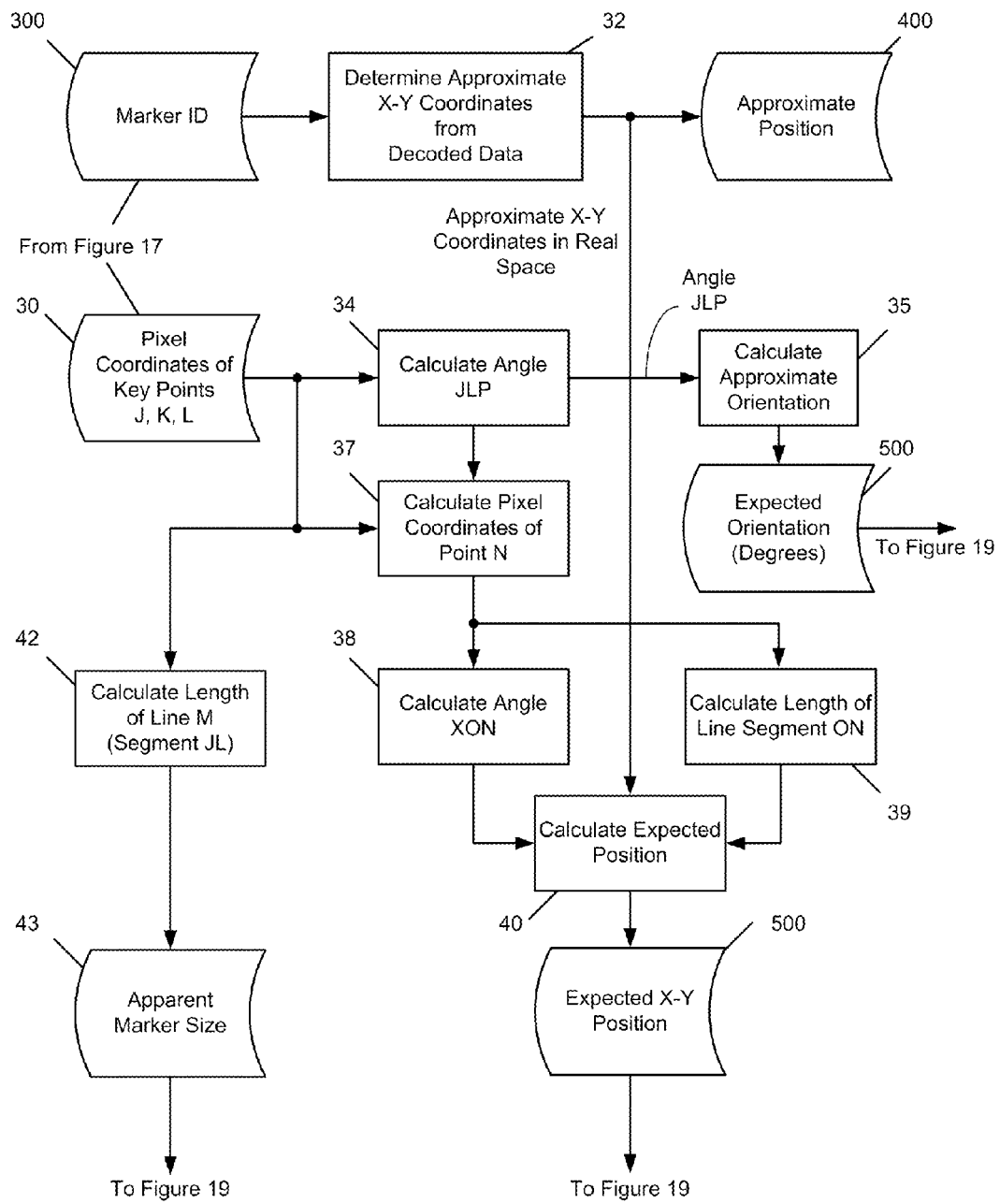
FIG. 18 shows a software flow diagram for expected position and rotational orientation determination.
Figure 19:
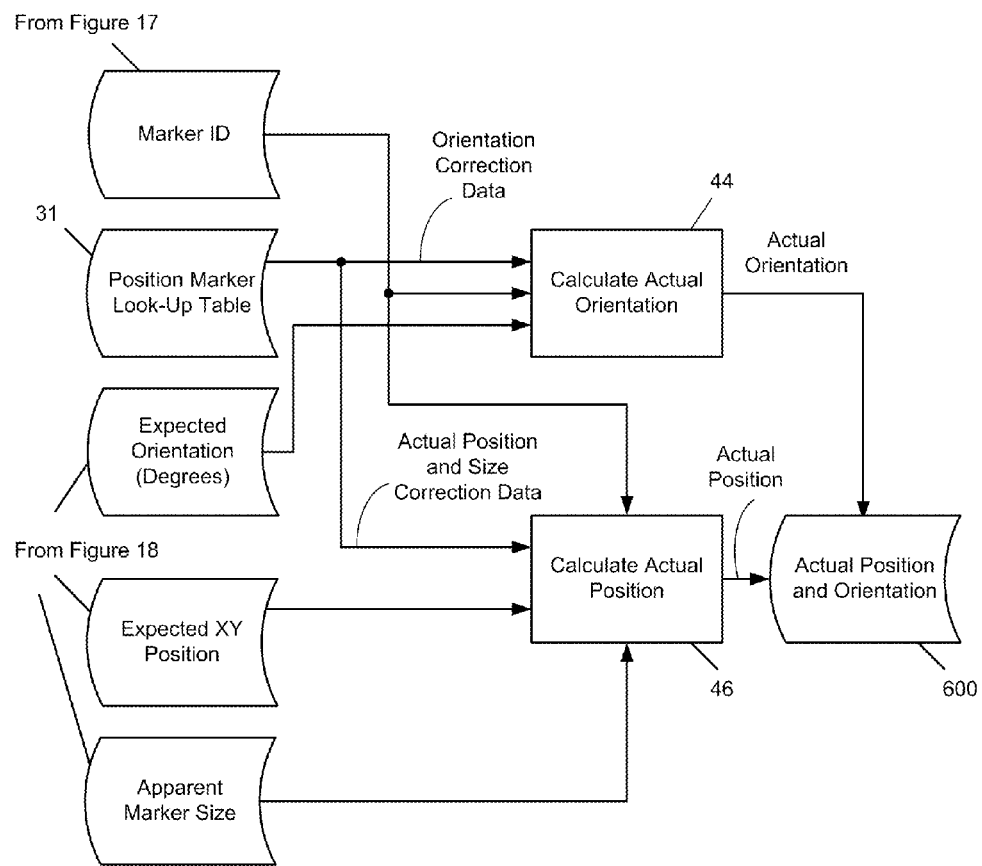
FIG. 19 shows a software flow diagram for the calculation of actual position and rotational orientation.

Referring to FIG. 18, marker identification can be translated directly into real X and Y position data for markers that are directly encoded. Object orientation is not determined.

Expected Position and Orientation Determination (160, 500)

Figure 14:
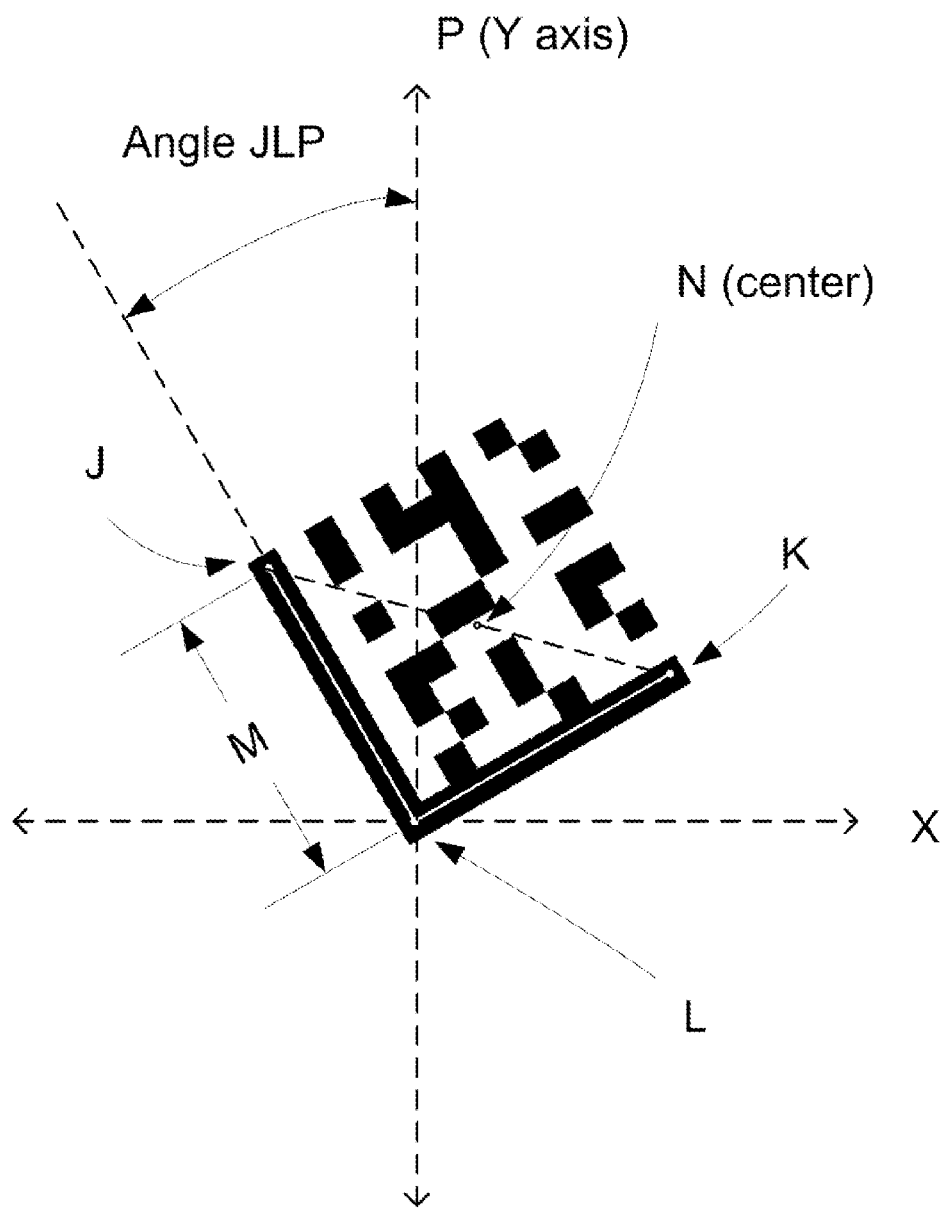
FIG. 14 defines point N (the midpoint of line JK), which defines the center of the symbol, and dimension M of position marker 3. Angle JLP indicates the rotational angle with respect to Cartesian coordinate axes X and Y.
Figure 15:
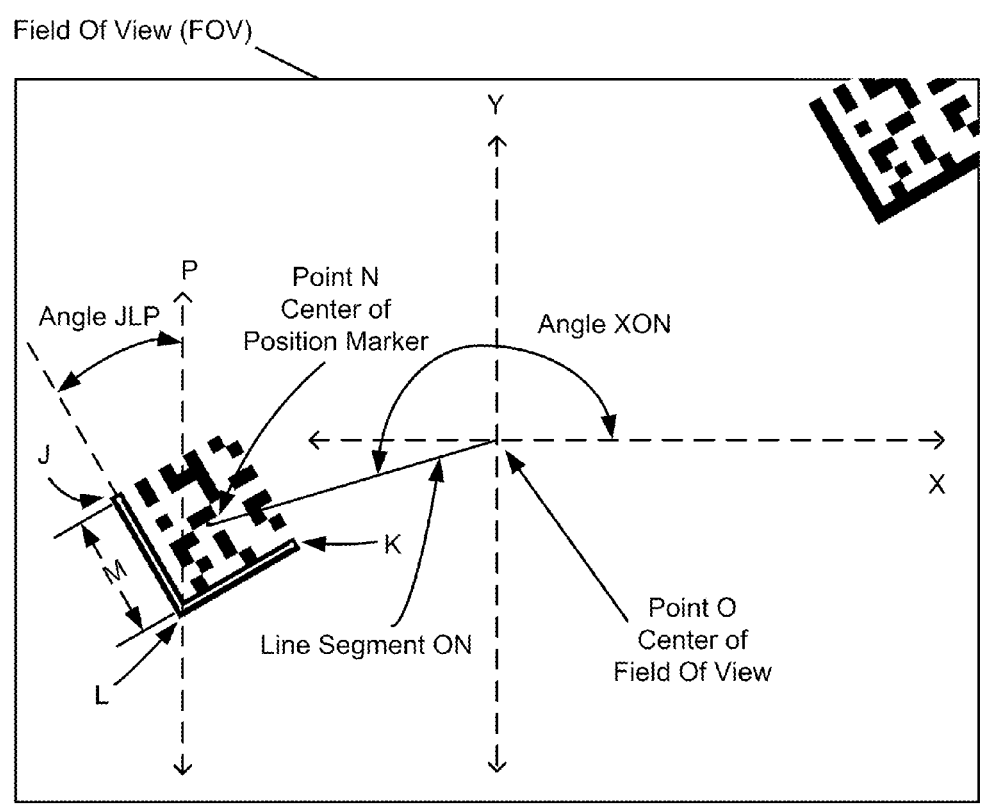
FIG. 15 shows a camera's field of view with one entire position marker and one partial position marker in view. The distance between the center of the field of view (point O) and the center of the position marker (point N) is defined as line segment ON. Angle XON is defined as the radial angle from the X axis to the position marker.
Figure 17:
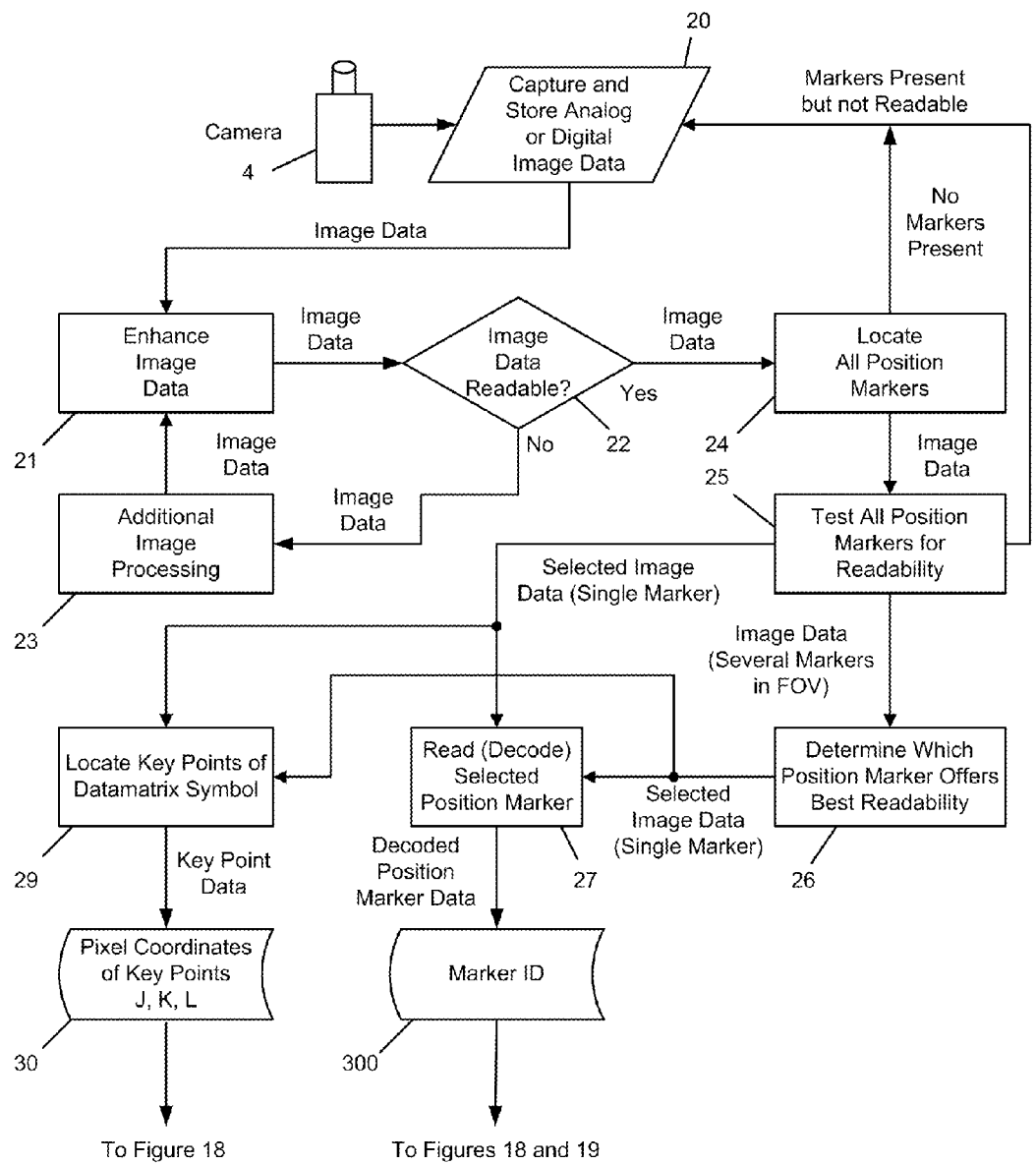
FIG. 17 presents a software flow diagram for image processing and feature extraction steps for marker type 3.

Geometric analysis of the marker's position and rotation relative to the field of view can more accurately determine the camera's position and orientation as in the earlier example. Pixel coordinates of Key Points J and L, 30, are used to calculate angle JLP, 34, the rotation angle of the position marker relative to the field of view. Angle JLP is illustrated in FIG. 14 and shown in the camera's field of view in FIG. 15. X and Y values of pixel coordinates J and K, 30, are summed and divided by two (37) to establish Point N (FIG. 14), the midpoint of line segment JK, and the center of the position marker. Point N coordinates are used to calculate (a) angle XON (FIG. 15) the radial angle between the center of the image and the center of the position marker; and (b) the length of line segment ON, which is equal to the radial distance from the center of the image (center of the camera), Point O, to the center of the position marker, Point N. Once these two values have been established, plane geometry is used to calculate 40 a more accurate X, Y camera position. The "expected position" is therefore an accurate calculation based on the expected position and orientation of the marker.

Actual Position and Orientation Determination (170, 180, 600)

Position Marker Look-Up Table 31 (FIG. 16) is the same as described earlier. Actual orientation is calculated 44 as the sum of the expected orientation and the look-up table correction value. Actual position is recalculated 46 exactly as in steps 150 and 160, but using look-up table data instead of expected (as decoded) X and Y data. Apparent marker size 43 is applied as an adjustment factor in calculation 46 for markers whose dimensions differ from nominal.

The final step is the combination 46 of actual rotational orientation and X and Y coordinates into a single unit of data which can be stored in local memory or transmitted to other devices. Rotational orientation and position data derived from the image processing steps may be optionally transformed into alternate units to indicate specific regions such as a zones, sectors, or areas.

Description of the Third Embodiment

Figure 20:
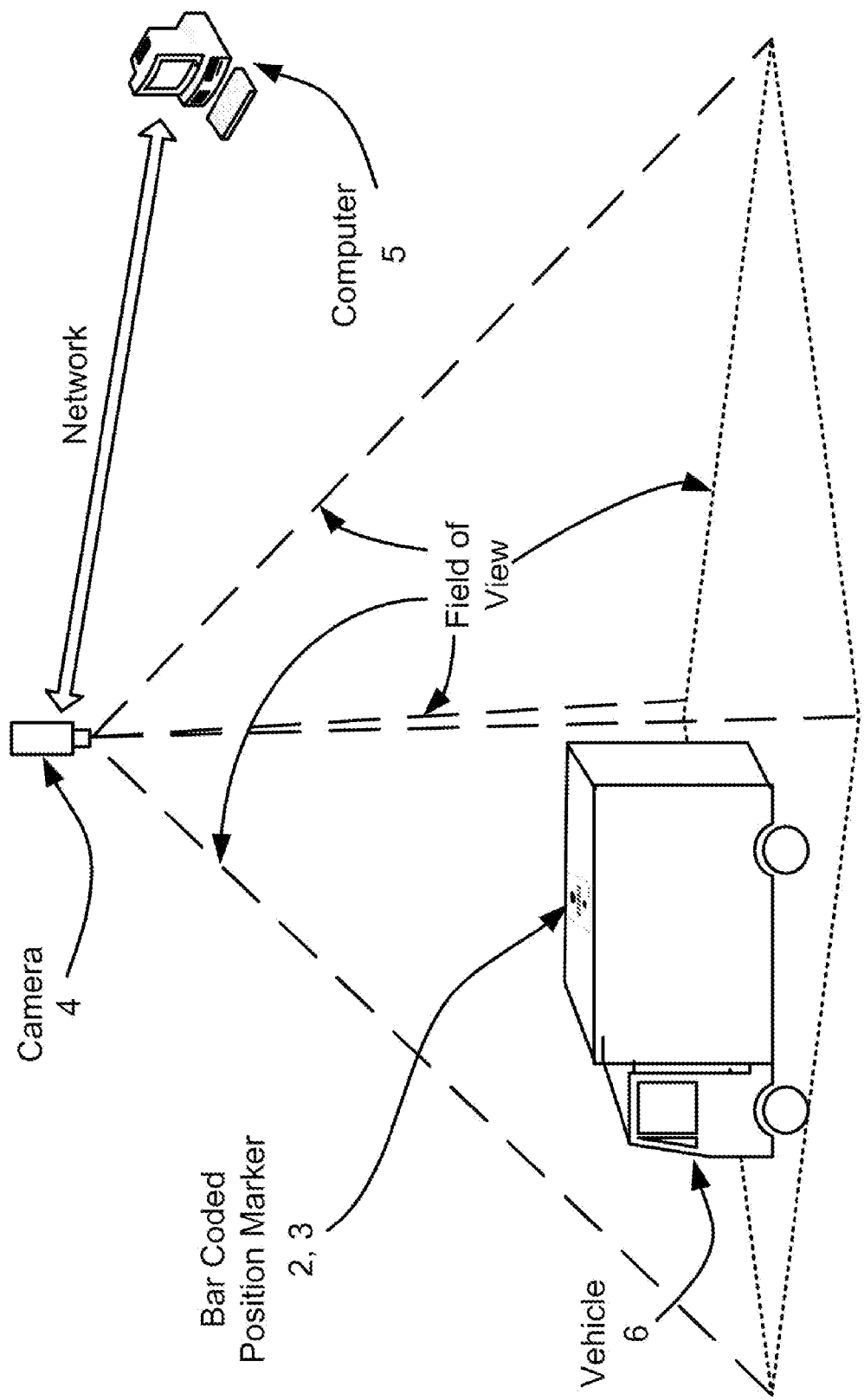
FIG. 20 shows an alternate embodiment whereby the machine vision camera is placed overhead and position markers are applied to the vehicle.

The invention can operate in a second physical arrangement wherein the camera is fixed in space and the markers are affixed to movable objects. FIG. 20 presents an application example, where machine vision camera 4 is mounted overhead and a position marker 2 or 3 is affixed to a vehicle. The camera views a predetermined area as vehicle 6 moves about the area. The marker is within the field of view so long as the vehicle remains within the predetermined area. Image processing steps are identical to embodiment 1 and 2, with the exception that camera coordinates in real space are used as a reference point, and object coordinates are calculated from image data. Image analysis steps are identical to earlier examples, but the transformation of image data into position data differs; in this arrangement the system determines where a viewed object is located instead of determining where the system itself is located. Orientation is calculated directly as before.

Figure 21:
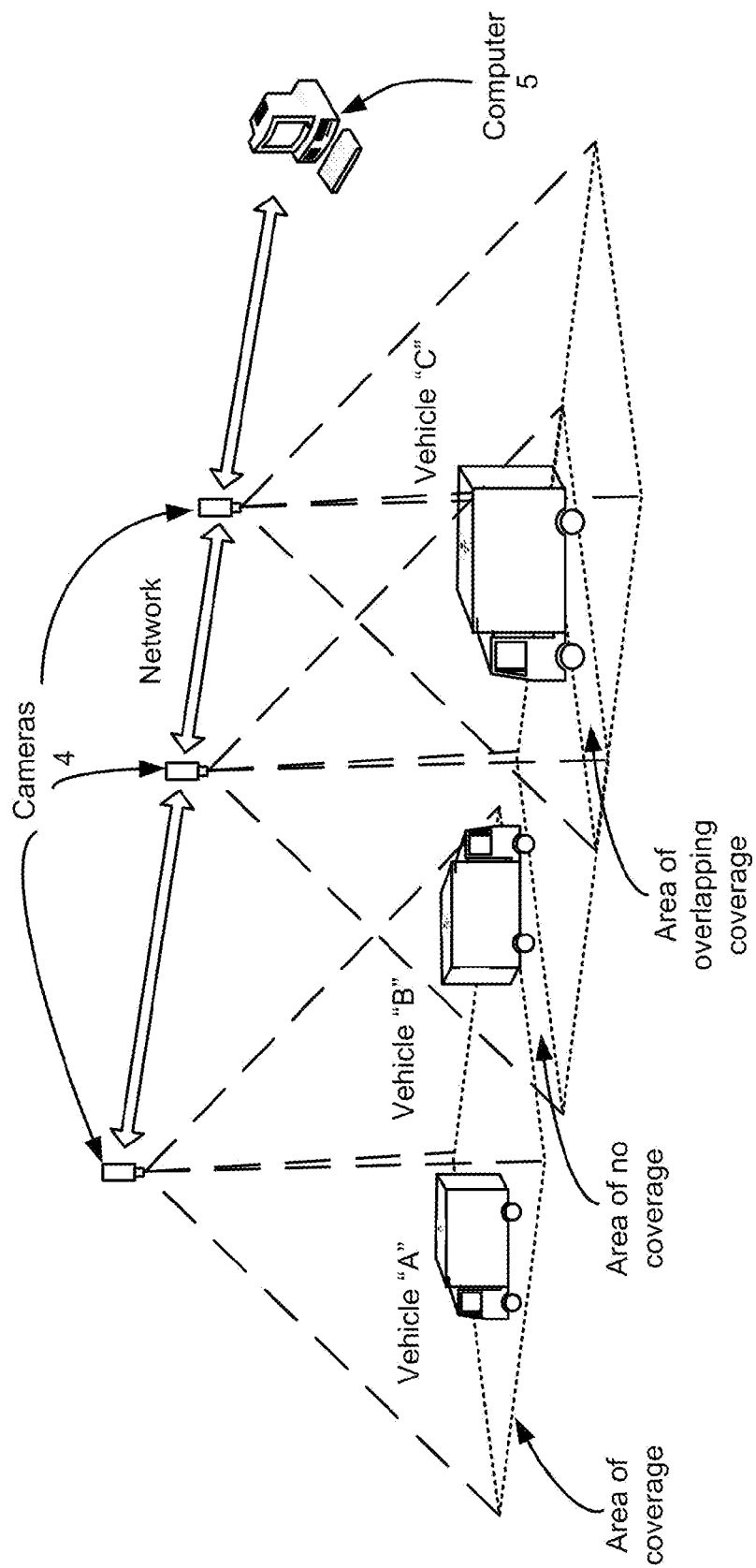
FIG. 21 shows an arrangement of multiple overhead cameras tracking multiple vehicles.

An illustration of the second arrangement is presented in FIG. 21, wherein a plurality of machine vision cameras tracks vehicles. Three predetermined coverage zones are shown, each covered by a separate machine vision camera. The drawing illustrates zones of no coverage, where a vehicle is not detected by the system, and zones of overlapping coverage, where multiple cameras detect and cross-check vehicle location and orientation. Computer 5 is connected to cameras via standard wired or wireless networks and performs the same functions described above for each camera, but in addition, records the location of all vehicles within the three areas.

Figure 22:
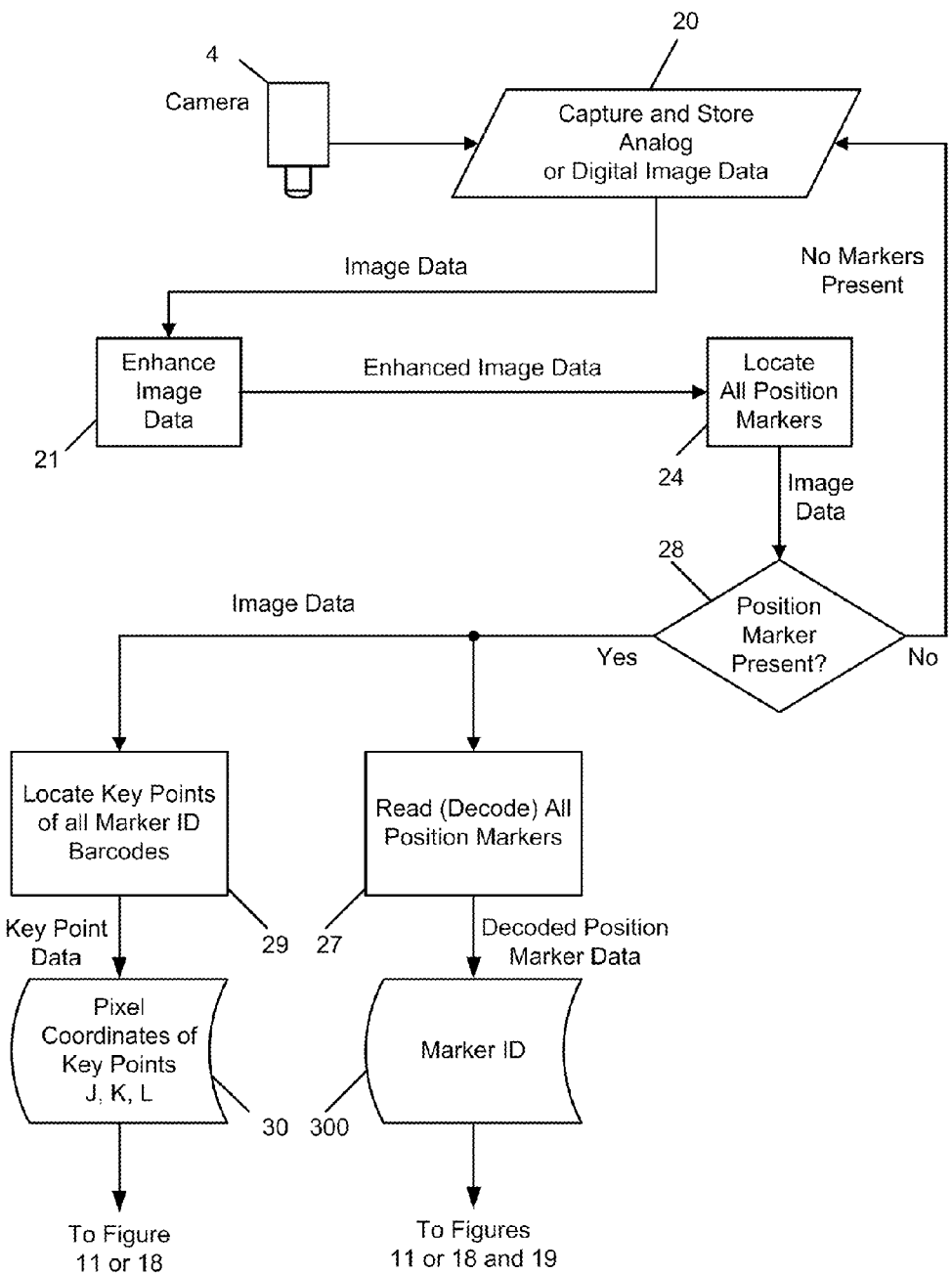
FIG. 22 shows a software flow diagram for the embodiments illustrated in FIGS. 20 and 21.

The important difference between this arrangement and embodiments 1 and 2 is that each image is analyzed for all position markers, and all position markers are processed. Therefore, image processing (FIG. 22) ignores image enhancement steps 22, 23 and best marker determination step 26, and proceeds directly from step 25 to steps 27 and 29.

The location and orientation of all markers (e.g. vehicles) in the plurality of fields of view can be stored, graphically displayed, or transmitted to other systems such for purposes of fleet management, collision avoidance, and so forth. The invention can keep track of the last known position of each vehicle; vehicle speed can be calculated, and predictions can be made for vehicle location in areas of no coverage and for impending collisions between vehicles.

What is claimed is:

1. A method of determining a coordinate position and rotational orientation of an object within a predefined coordinate space, the method comprising:
    providing a plurality of unique position markers having identifying indicia and positional reference indicia thereupon, the markers being arranged at predetermined known X, Y, and Z coordinate positional locations within the coordinate space so that at least one position marker is within view of the object;
    maintaining a look-up-table comprising actual X, Y, and Z coordinates and rotational orientations of all position markers within the coordinate space;
    using an image acquisition system comprising a camera mounted on the object, acquiring an image of the at least one position marker within view;
    processing the image to determine the identity, the coordinate position relative to the object, and the rotational orientation relative to the object of each position marker within view;
    determining and selecting the position marker nearest to the center of the image;
    determining an approximate position of the object by retrieving the actual X, Y, and Z coordinates and rotational orientation of the selected position marker from said look-up-table; and
    using the selected position marker, calculating the coordinate position of the object and the rotational orientation of the object in the coordinate space and storing the position and the rotational orientation information in a memory.

2. The method of claim 1, wherein the step of calculating the position of the object and the rotational orientation of the object in the coordinate space further comprises:
    identifying two key points in the position marker;
    defining a line between the two key points;
    calculating the length of the line;
    determining the center of the line to define the center of the position marker;
    determining a vector from the center of the image to the center of the position marker;
    determining a length and angle of this vector relative to the field of view by plane geometry; and
    calculating an actual position of the object by correcting the approximate position of the object by using the length and angle of the vector to calculate a position offset,
    wherein the Z coordinate position of the object is determined from the length of the line between the two key points and the Z coordinate of the position marker, by calculating the proportional distance between the camera and the position marker by scaling the line length into units of actual space.

3. The method of claim 2, wherein the position markers are arranged substantially in a plane defined by the Z coordinate of the coordinate space.

4. The method of claim 2, wherein the position markers are arranged at different Z coordinate positions.

5. An apparatus useful for determining a coordinate position and rotational orientation of an object within a predefined coordinate space, the apparatus comprising:
    a plurality of unique position markers arranged at predetermined positional locations within the coordinate space such that at least one position marker is within view of the object, wherein each position marker comprises a substantially planar material imprinted with an asymmetric pattern which encodes the identity and angular orientation of the position marker;
    an image acquisition system mounted on the object, for acquiring an image of at least one position marker within view;
    an image processing system for processing pixels in the acquired image to determine the identity of each position marker within view, the position of each position marker relative to the object, the rotational orientation of each position marker relative to the object; and
    a post processing system for calculating the position of the object and the rotational orientation of the object in the coordinate space.

6. The apparatus of claim 5, wherein the image acquisition system comprises a machine vision system, the machine vision system comprising a camera, a light source, and image capture electronics wherein the light source of the machine vision system is located adjacent to the camera.

7. The apparatus of claim 6, wherein the light source is pulsed.

8. The apparatus of claim 6, wherein the light source is continuous.

9. The apparatus of claim 6, wherein the light source emits a narrow wavelength band of illumination.

10. The apparatus of claim 6 wherein the light source comprises one or more light emitting diodes (LEDs).

* * * * *